United States Patent
Kashiwagi et al.

(10) Patent No.: US 8,854,938 B2
(45) Date of Patent: Oct. 7, 2014

(54) OPTICAL RECORDING MEDIUM, MANUFACTURING METHOD FOR OPTICAL RECORDING MEDIUM

(75) Inventors: Toshiyuki Kashiwagi, Tokyo (JP); Yoshihiro Akimoto, Chiba (JP); Kimihiro Saito, Kanagawa (JP); Akiya Saito, Kanagawa (JP)

(73) Assignee: Sony Corporationn, Tokyo (JP)

( * ) Notice: Subject to any disclaimer, the term of this patent is extended or adjusted under 35 U.S.C. 154(b) by 0 days.

(21) Appl. No.: 13/817,033

(22) PCT Filed: Aug. 11, 2011

(86) PCT No.: PCT/JP2011/068379
§ 371 (c)(1),
(2), (4) Date: Feb. 14, 2013

(87) PCT Pub. No.: WO2012/023491
PCT Pub. Date: Feb. 23, 2012

(65) Prior Publication Data
US 2013/0142028 A1    Jun. 6, 2013

(30) Foreign Application Priority Data

Aug. 19, 2010 (JP) ............................. P2010-184371
Jul. 15, 2011 (JP) ............................. P2011-156275

(51) Int. Cl.
| G11B 7/00 | (2006.01) |
| G11B 7/24085 | (2013.01) |
| G11B 7/007 | (2006.01) |
| G11B 7/26 | (2006.01) |

(52) U.S. Cl.
CPC ........ *G11B 7/00736* (2013.01); *G11B 7/24085* (2013.01); *G11B 7/263* (2013.01); *G11B 7/261* (2013.01)

USPC .................................... 369/53.21; 369/59.25

(58) Field of Classification Search
None
See application file for complete search history.

(56) References Cited

U.S. PATENT DOCUMENTS 7,616,552 B2 * 11/2009 Abe et al. .................. 369/275.4

FOREIGN PATENT DOCUMENTS

| JP | S60-160082 A | 8/1985 |
| JP | H11-045461 A | 2/1999 |
| JP | 2003-030856 A | 1/2003 |
| JP | 2005-032427 A | 2/2005 |
| JP | 2005-518055 A | 6/2005 |
| JP | 2006-517326 A | 7/2006 |

* cited by examiner

*Primary Examiner* — Wayne Young
*Assistant Examiner* — Brian Butcher
(74) *Attorney, Agent, or Firm* — Sony Corporation

(57) ABSTRACT

An optical recording medium and a manufacturing method for forming the optical recording medium is provided.
The optical recording medium includes a bar code-shaped reflection pattern that includes high reflection rate regions and low reflection rate regions and information is recorded with the bar code-shaped reflection pattern. The low reflection rate region is formed with pit strings. The high reflection rate region and the low reflection rate region are formed to satisfy: $S+M/2 \leq 0.6H$, where a signal level of a reproduction signal obtained from a reflection light in the high reflection rate region is denoted as "H", a signal level of a reproduction signal obtained from a reflection light in the low reflection rate region is denoted as "S", and a degree of modulation of the reproduction signal obtained from the reflection light in the low reflection rate region is denoted as "M".

15 Claims, 21 Drawing Sheets

OPTICAL RECORDING MEDIUM, MANUFACTURING METHOD FOR OPTICAL RECORDING MEDIUM

TECHNICAL FIELD

The present disclosure relates to an optical recording medium such as an optical disk and a manufacturing method therefor. More particularly, the present disclosure relates to a region recorded with information in a bar code-shaped pattern on an optical recording medium.

CITATION LIST

Patent Document

Patent literature 1: Japanese Patent Application Laid-Open No. 2005-518055

BACKGROUND ART

An optical disk such as a Blu-ray Disc (registered trademark) and a DVD (Digital Versatile Disc) is known to be provided with a bar code-shaped recording region in a predetermined region of a disk inner peripheral side. This is called BCA (Burst Cutting Area).

This BCA has a radial pattern formed as a region having a different reflection rate, so that the BCA is a region from which information can be read without tracking. In addition, in particular, in optical disks manufactured in large volume, the BCA is used as a region to which information peculiar to a disk, e.g., information about a serial number, can be attached.

In the conventional BCA, the optical disk is completed as a result of the manufacturing steps, and thereafter, a serial number, disk information, and the like is written off-line by a BCA recording device, for each disk, to a further inner periphery of the signal region (for example, a region of a radius of 21 to 22 mm), so that each can be managed.

The BCA is a pattern in which the high reflection rate region and the low reflection rate region appear alternately when scanned in the track line direction, and information can be read from the level of the reflection light of each region. In order to form the low reflection rate region, the BCA recording device outputs high power laser, so that the region is formed by burning off the reflection film.

SUMMARY OF THE INVENTION

Problems to be Solved by the Invention

As described above, the BCA records information unique to each disk, and accordingly, information is written to each disk manufactured, and therefore, a dedicated expensive BCA recording device is required in each manufacturing line, and there is a problem in that the manufacturing cost increases.

On the other hand, not information unique to each disk, but it may be desired to record the same information to the BCA of a somewhat comprehensive disk group. For example, this is a case where information unique to a manufacturing line is recorded.

It is an object of the present disclosure to provide a BCA mode, a manufacturing method for an optical recording medium, suitable for such cases.

Solutions to Problems

An optical recording medium according to the present disclosure is formed with a bar code-shaped reflection pattern by forming a high reflection rate region and a low reflection rate region, which appear alternately when seen in a track line direction, in such a state that each is continuous in a track pitch direction, the optical recording medium comprising a recording region in which information is recorded with the reflection pattern, wherein the low reflection rate region is formed with a pit string, and the high reflection rate region and the low reflection rate region are formed to satisfy: S+M/2≤0.6H, where a signal level of a reproduction signal obtained from a reflection light in the high reflection rate region is denoted as "H", a signal level of a reproduction signal obtained from a reflection light in the low reflection rate region is denoted as "S", and a degree of modulation of the reproduction signal obtained from the reflection light in the low reflection rate region is denoted as "M".

An optical recording medium according to the present disclosure is formed with a bar code-shaped reflection pattern by forming a high reflection rate region and a low reflection rate region, which appear alternately when seen in a track line direction, in such a state that each is continuous in a track pitch direction, the optical recording medium comprising a recording region in which information is recorded with the reflection pattern, wherein the recording region is reproduced with a laser light having a wavelength of 405 nm emitted by an optical system of which NA is 0.85, and in the low reflection rate region, a spatial frequency in the track line direction is formed with pit strings of 1667 lines/mm or more.

The optical recording medium is a disk-shaped optical recording medium, and the high reflection rate region and the low reflection rate region are formed such that each is continuous radially in a radial direction which is the track pitch direction, whereby the bar code-shaped reflection pattern is formed.

In the pit string of the low reflection rate region, a ratio between a pit portion and a land portion is 50±5%.

In the pit string of the low reflection rate region, adjacent pit strings in the track pitch direction overlap each other.

The high reflection rate region is a mirror portion where no pit string is formed.

The high reflection rate region is formed with a pit string or group from which a reproduction signal level higher than the pit string in the low reflection rate region can be obtained.

A manufacturing method of the present disclosure is a manufacturing method for the optical recording medium formed with the recording region having the high reflection rate region and the low reflection rate region as described above, the manufacturing method includes an original disk manufacturing step for manufacturing an original disk arranged with an uneven pattern based on recording information, a stamper making step for making a stamper on which the uneven pattern of the original disk is transferred, a substrate making step for making a substrate on which the uneven pattern of the stamper is transferred, and an optical recording medium forming step for forming an optical recording medium by forming a predetermined layer structure on the substrate. In the original disk manufacturing step, the uneven pattern corresponding to the recording region including the high reflection rate region and the low reflection rate region is formed on the original disk, so that the recording region is formed on the optical recording medium formed in the optical recording medium forming step.

The above technique of the present disclosure employs an idea, for example, in the bar code-shaped recording region such as the BCA, the low reflection rate region is formed with the pit strings. The high reflection rate region may have a higher reflection rate than the pit strings in the low reflection rate region.

When the low reflection rate region is formed with pit strings, for example, the pit strings are formed in view of the spatial frequency limit, and are formed in view of the relationship between the degree of modulation and each reproduction signal level from the high reflection rate regions and the low reflection rate regions. Accordingly, when the low reflection rate region is formed with the pit strings, it is possible to form the appropriate recording region (BCA).

Effects of the Invention

According to the present disclosure, the low reflection rate region is not formed by burning off the reflection film but is formed by forming a pit string, and therefore, a bar code-shaped recording region can be formed in a stage of a step of manufacturing a master disk, for example. Therefore, this is suitable for improving the efficiency of the manufacturing step of the optical recording medium, and reducing the cost. Further, when the pit string in the low reflection rate region is formed in view of the degree of modulation and each reproduction signal level from the high reflection rate region and the low reflection rate region and the spatial frequency limit, a high quality reproduction signal can be obtained from the recording region, and an appropriate bar code-shaped recording region can be achieved.

MODE FOR CARRYING OUT THE INVENTION

Hereinafter, embodiments of the present disclosure will be explained in the following order.
<1. Overview of embodiment>
<2. First embodiment>
<3. Second embodiment>
<4. Third embodiment>
<5. Fourth embodiment>
<6. Disk manufacturing step>

1. Overview of Embodiment

An optical disk of the embodiment will be explained.

The optical disk of the embodiment can be embodied as, for example, a ROM-type disk in a scope of a high-density optical disk method which is called a Blu-ray disk, and further, as a write-once-type disk (BD-R) or a rewritable-type disk (BD-RE).

An example of a physical parameter of the high-density optical disk according to the present embodiment will be explained.

The optical disk of the present example has such a disk size of which diameter is 120 mm and disk thickness is 1.2 mm. These features are the same as those of a disk of a CD (Compact Disc) method and a disk of a DVD (Digital Versatile Disc) method in terms of external appearance.

A laser for recording and reproduction uses a so-called blue laser (for example, wavelength $\lambda$=405 nm), and the optical system has a high NA (for example, NA=0.85). Further, a narrow track pitch (for example, track pitch=0.32 μm), and a high linear density (for example, recording linear density 0.112 μm/bit) are achieved. Accordingly, a disk having a diameter of 12 cm achieves a user data capacity of about 23 G to 25 GB (Giga Byte). Moreover, when recorded with a still higher density, a capacity of about 30 GB may be possible.

When a multi-layer disk having multiple recording layers is also developed. In a case of the multi-layer disk, the user data capacity increases by substantially the number of layers.

Figure 1:
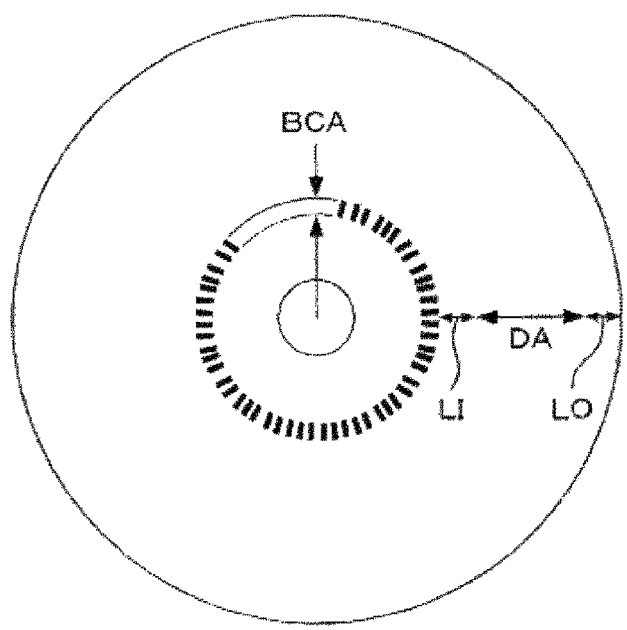
FIG. 1 is an explanatory diagram illustrating a BCA according to an embodiment of the present disclosure.

FIG. 1 schematically illustrates a layout of the entire disk (region configuration).

The main region of the disk includes a lead in zone LI, a data zone DA, and a lead out zone LO which are arranged from the inner peripheral side.

The lead in zone records physical properties of a disk, management information for recording and reproduction, and the like. The data zone is used for main data such as content data such as video and music, computer purpose data such as application programs, and the like. The lead out zone LO may be a buffer area, or may record management information.

These regions are used for normal recording and reproduction, but in particular, a BCA (Burst Cutting Area) is provided at the inner peripheral side with respect to the lead in zone LI for the purpose of individual disk management and the like.

As illustrated in the figure, the BCA is formed by a bar code-shaped pattern formed radially. This BCA includes high reflection rate regions and low reflection rate regions which appear alternately in the track line direction, and each of the high reflection rate regions and the low reflection rate regions is formed to be continuous in the track pitch direction (radial direction, so that the BCA is made into a bar code-shaped reflection pattern. For example, the high reflection rate regions and the low reflection rate regions are formed continuously in a range extending over radius 21.0 mm to 22.2 mm, so that the high reflection rate regions and the low reflection rate regions are made into the bar code shape.

In this case, with the bar code-shaped pattern, information can be read from this BCA range without any tracking.

In the past, unique ID and the like peculiar to a disk recording medium is recorded to the BCA according to a recording method for burning off the reflection film of the recording layer, for example.

As explained later, in the present embodiment, the BCA is formed according to a method different from this.

In the embodiment, in the BCA, not each optical disk, but the same information is recorded to a certain lot.

Further, as explained later, for this reason, an uneven pattern corresponding to the BCA is formed on the original disk in the step of mastering for this reason. More specifically, the low reflection rate regions of the BCA are not formed according to the method for burning off the reflection film. For this reason, after the optical disk is manufactured, a step of forming the BCA on each disk with the BCA recording device is eliminated.

Then, the BCA is in a mode different from a conventional BCA, but even an optical disk of the embodiment in which the BCA of the present example is formed can be reproduced without causing any problem with a conventional reproduction device.

In this case, a basic idea for developing the BCA on the optical disk of the embodiment will be explained.

FIG. 4(a) schematically illustrates a conventional BCA.

Like FIG. 1, in terms of external appearance, the BCA in the conventional optical disk is also made into a bar code pattern in a radiation pattern.

As illustrated in FIG. 4(a), the low reflection rate regions and the high reflection rate regions of the BCA appear alternately in the track line direction. The high reflection rate region is a pit string portion including a pit string P and a land L. For example, like pit strings formed in the lead in zone LI and the data zone DA, the pit string in the high reflection rate region is modulated by RLL (1-7).

On the other hand, the low reflection rate region is a region made by causing the BCA recording device to burn off the reflection film.

More specifically, in a case of a conventional optical disk, the BCA region (range of radius 21.0 mm to 22.2 mm) is a region formed with a normal pit string in a step of manufacturing each optical disk in mass production. In the optical disk, the reflection film is burned off with predetermined timing (timing in accordance with unique data to be recorded) in synchronization with the disk rotation by the BCA recording device.

Accordingly, the low reflection rate regions are continuous in the radial direction. As a result, the bar code-shaped reflection pattern is formed in which each of the high reflection rate regions and the low reflection rate regions which appear alternately in the track line direction are continuous in the radial direction.

When the reproduction device reproduces the BCA, the waveform of the obtained RF signal (reproduction signal) is what is illustrated in FIG. 4(b). More specifically, in the high reflection rate region formed with the pit string, a certain level of reflection light in accordance with the pit string is obtained, and therefore, the RF signal waveform is at a certain level in average while somewhat changing due to the pit string/land.

On the other hand, in the low reflection rate region, the reflection film is burned off, and therefore, reflection light is hardly obtained, and the RF signal waveform is at a very low level.

In the reproduction device, information of "1" "0" can be obtained from difference of the amplitude of the RF signal in the high reflection rate regions and the low reflection rate regions, and therefore, the information recorded in the BCA can be read.

However, as described above, in this method, the BCA recording device records the BCA to each optical disk manufactured, and therefore, this method is extremely disadvantageous in terms of the efficiency and the cost of manufacturing.

Moreover, there is a request to include not individual information about each optical disk, but to include the same information in units of lots.

In view of such circumstances, an uneven pattern corresponding to the BCA may be formed in the step of mastering as described above, and when a disk substrate is formed using a stamper, a bar code-shaped pattern which becomes the BCA may be formed on the disk substrate. In this case, the reduction of the efficiency and the increase in the cost due to the BCA recording can be solved.

Therefore, in the present embodiment, in order to form the BCA without burning off, the low reflection rate regions are formed with the pit strings. The high reflection rate region is a region of which reflection rate is higher than that of the pit string. For example, it is a mirror portion.

In this case, when the low reflection rate region is formed with the pit string, the following issues are required to be taken into consideration.

Figure 5:
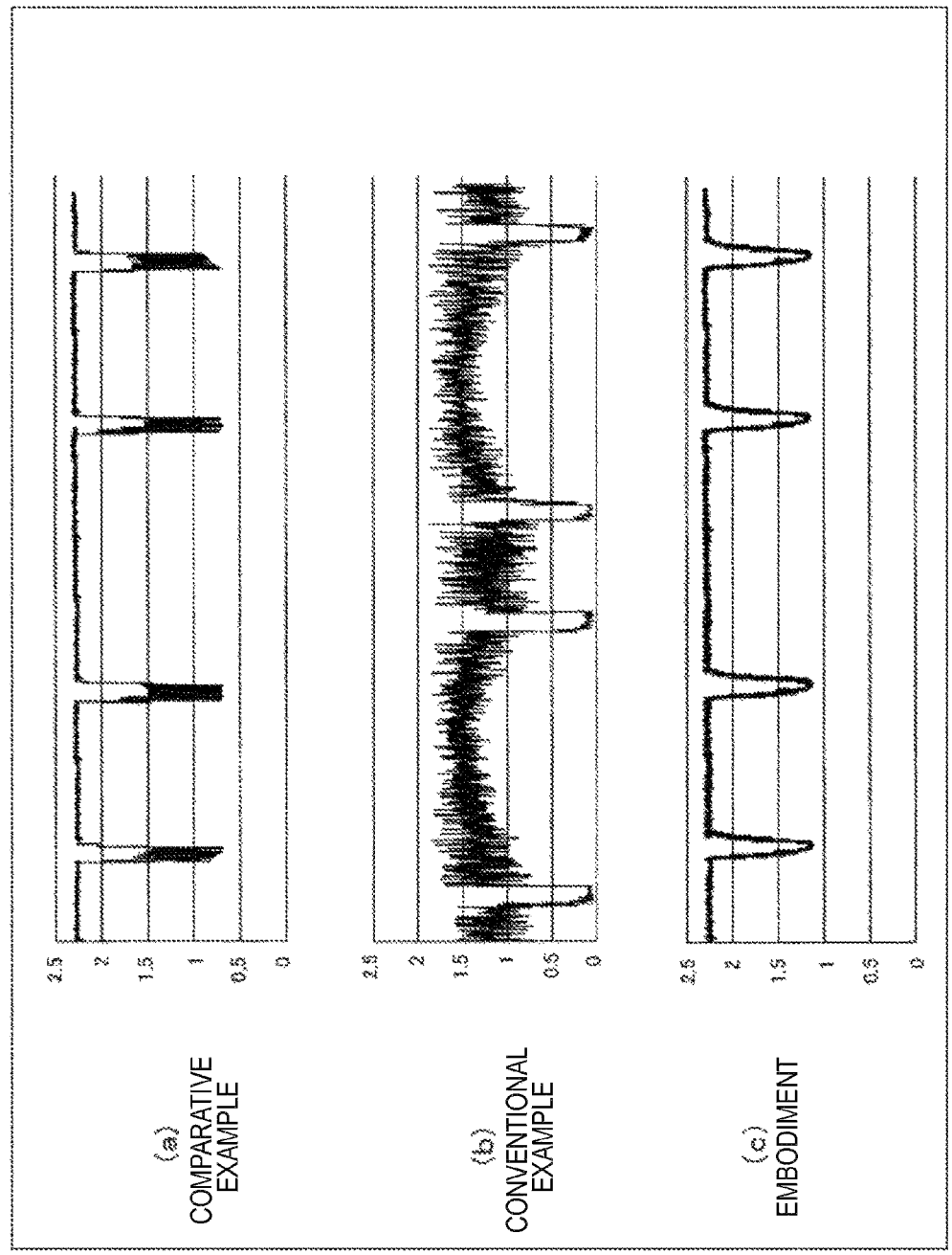
FIGS. 5(a) to 5(c) are explanatory diagrams illustrating a reproduction signal waveform from the conventional BCA and the embodiment.

FIG. 5(b) illustrates a reproduction waveform of the conventional BCA.

An amplitude in a range of which center is "1" to "1.5" as indicated by a vertical axis of this figure is obtained as an RF signal level from the pit string portion.

As explained in FIGS. 4(a) and 4(b), in the conventional BCA, the pit string portion is the high reflection rate region, and the burned-off portion is the low reflection rate region. In the low reflection rate region (burned-off portion), the RF signal level is close to "0" as shown in FIG. 5(b).

Since the high reflection rate region is affected by the modulation with the pit string, the RF signal level is around "1" to "1.5" as shown in FIG. 5(b).

When the amplitude greatly changes due to the modulation with the pit string, it is difficult to perform appropriate binarization. However, in the conventional BCA, first of all, the level in the burned-off portion is substantially "zero", and even if the RF signal level from the pit string portion is somewhat modulated, this would not cause defect in the binarization. For example, when the level "0.5" in this figure is slice level, the binarization can be performed without any doubt.

On the other hand, in the present embodiment, the low reflection rate region is formed as the pit string. For example, the high reflection rate region is considered to be a mirror portion. In the mirror portion, no pit string P is formed, and it is where the land L is continuous. More specifically, it is a portion having a high reflection rate without being affected by diffraction with the pit string P.

The RF signal waveform in this case is illustrated in FIG. 5(a) as a comparative example. Since the low reflection rate region is the pit string portion, the RF signal level is around "1" to "1.5". Moreover, it is affected by the modulation with the pit string, and a relatively large level change is observed.

The high reflection rate region is at a higher level than the low reflection rate region.

More specifically, both of the high reflection rate region and the low reflection rate region have a higher RF signal levels as compared with the case of FIG. 5(b), and a modulation component is generated in the RF signal in the low reflection rate region.

In this case, there is a relatively small difference between the RF signal level of the high reflection rate region and the RF signal level of the low reflection rate region in which the amplitude greatly changes due to the modulation. Then, depending on cases, a relatively large amplitude in the low reflection rate region goes up and down the slice level, and it is highly possible that this may cause false binarization.

As a result, the reproduction device cannot appropriately read out BCA information, and repeatedly retries BCA reproduction, and ultimately, the reproduction device may eject the disk as a disk error, or may stop operation while the reproduction device is still unable to perform reproduction without performing content reproduction.

In the Blu-ray disk standard, the reproduction signal level in the low reflection rate region is defined as 0.549 or less with respect to the reproduction signal level in the high reflection rate region. In general, the recording reproduction device is designed with a margin of about 10%, and therefore, no problem would be caused in the reproduction as long as the reproduction signal level in the low reflection rate region including the modulation is 0.6 or less (0.603 or less).

Therefore, in the present embodiment, when the low reflection rate region is formed with the pit string, this point is to be taken into consideration, and the reproduction signal level including the modulation from the low reflection rate region is required to be reduced as much as possible, so as to satisfy the above standard that the reproduction signal level is 0.6 or less.

More specifically, this is as follows.

The signal level of the reproduction signal obtained from the reflection light in the high reflection rate region is defined as "H", and the signal level of the reproduction signal obtained from the reflection light in the low reflection rate region is defined as "S". The degree of modulation of the reproduction signal obtained from the reflection light in the low reflection rate region (i.e., the pit string portion in the present embodiment) is defined as "M".

In the present embodiment, in this case, the high reflection rate regions and the low reflection rate regions are formed to satisfy the following expression. $S+M/2 \leq 0.6H$

2. First Embodiment

The BCA will be explained as the first embodiment with reference to FIGS. 2(a) to 2(c), and 3(a) and 3(b).

Figure 2:
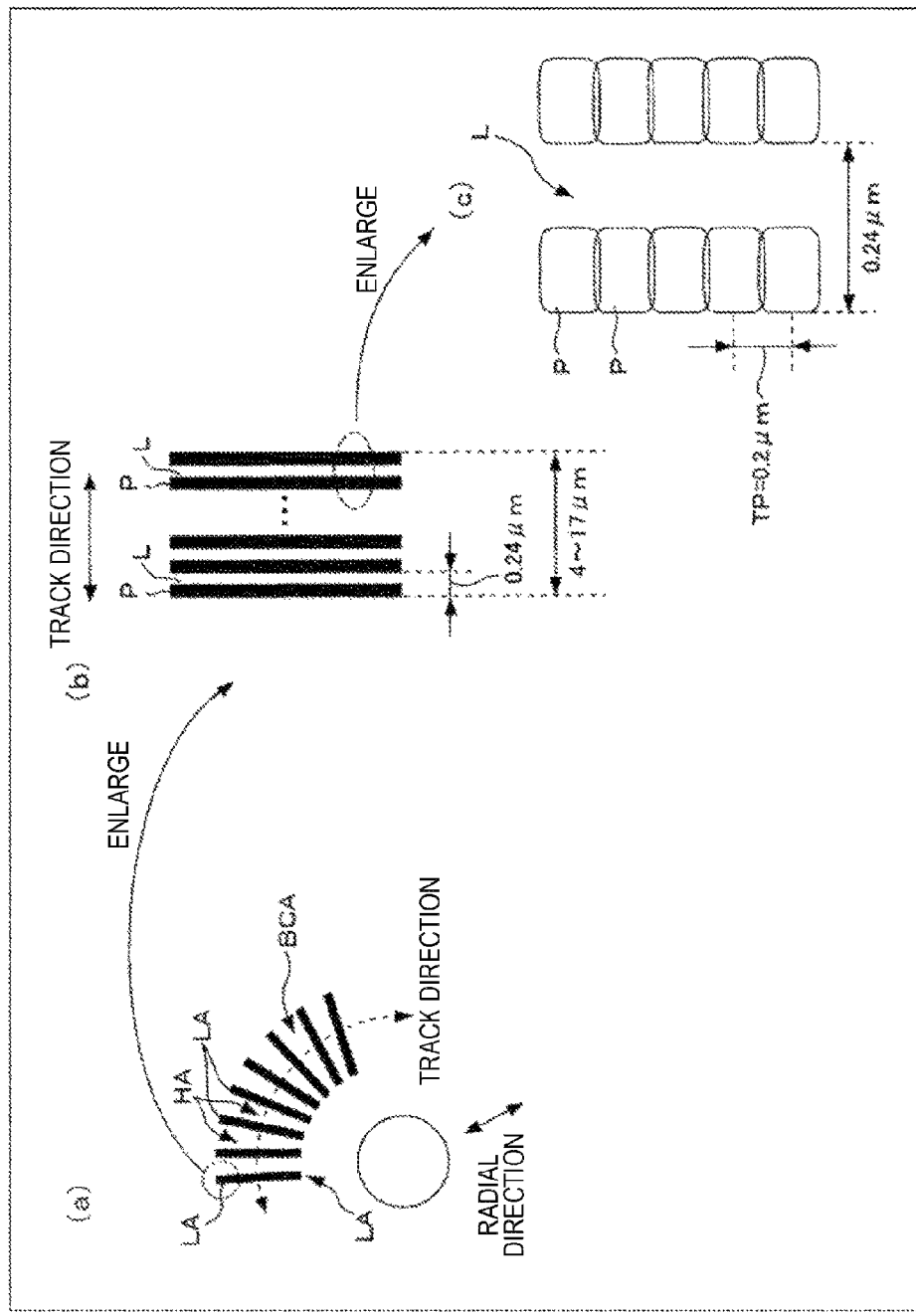
FIGS. 2(a) to 2(c) are explanatory diagrams illustrating a low reflection rate region and a high reflection rate region of the BCA according to the first embodiment.

FIG. 2(a) schematically illustrates a portion of a bar code pattern radially in the BCA portion of the optical disk as illustrated in FIG. 1.

In this case, in the bar code-shaped pattern, a portion denoted with a black belt is defined as a low reflection rate region LA, and a white portion between black belts is defined as a high reflection rate region HA.

One of the low reflection rate regions LA as illustrated by the black belts are enlarged and illustrated in FIG. 2(b).

As illustrated in FIG. 2(b), one belt is formed in narrow belt shapes constituted by the pit strings P and the lands L. The belt-shaped portion of FIG. 2(b) is further illustrated in FIG. 2(c), but the fine belt-like portion is formed by the lands L and the pit strings P overlapping in the radial direction (track pitch direction).

Figure 3:
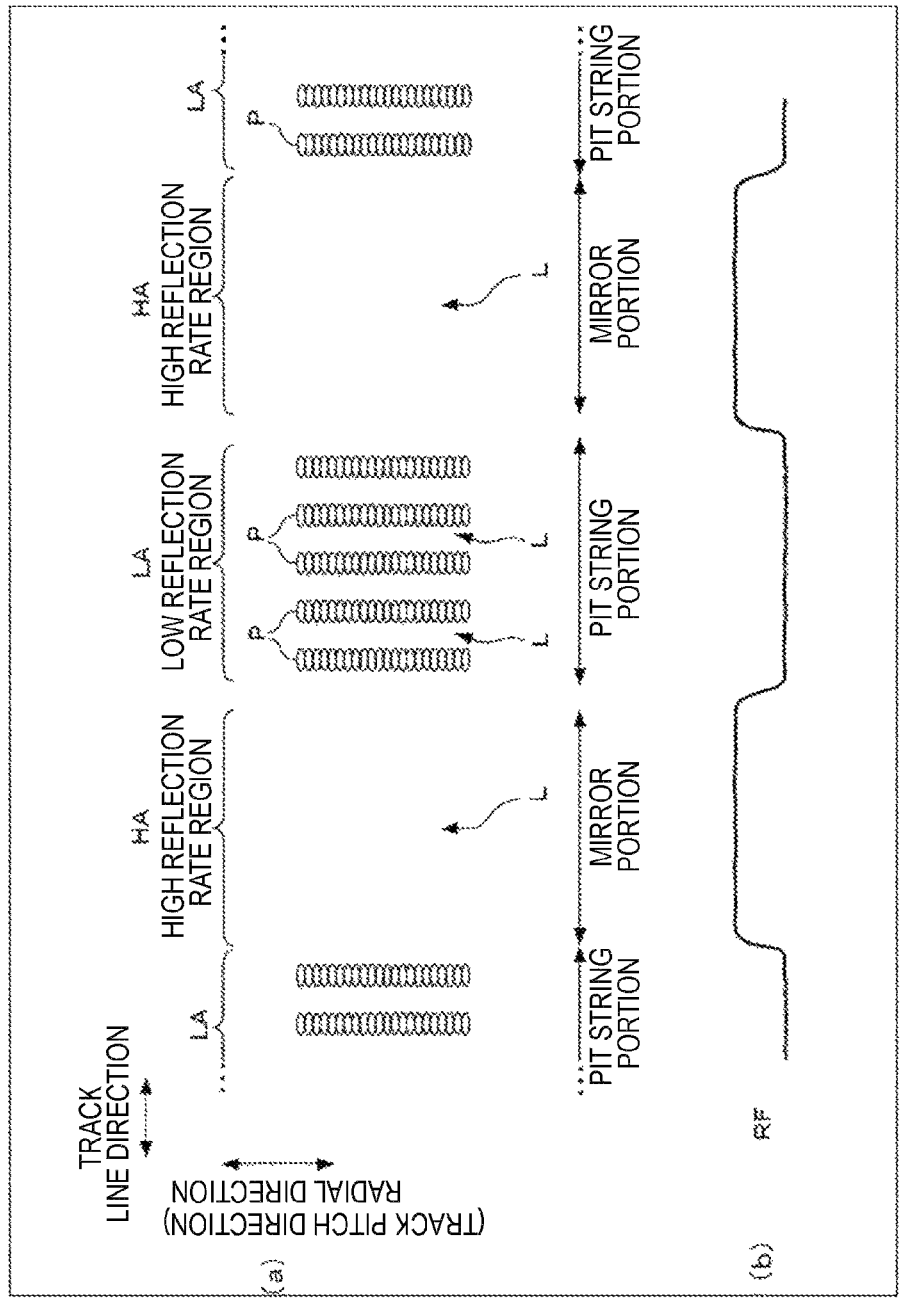
FIGS. 3(a) and 3(b) are schematic explanatory diagrams illustrating a BCA according to the first embodiment.
Figure 4:
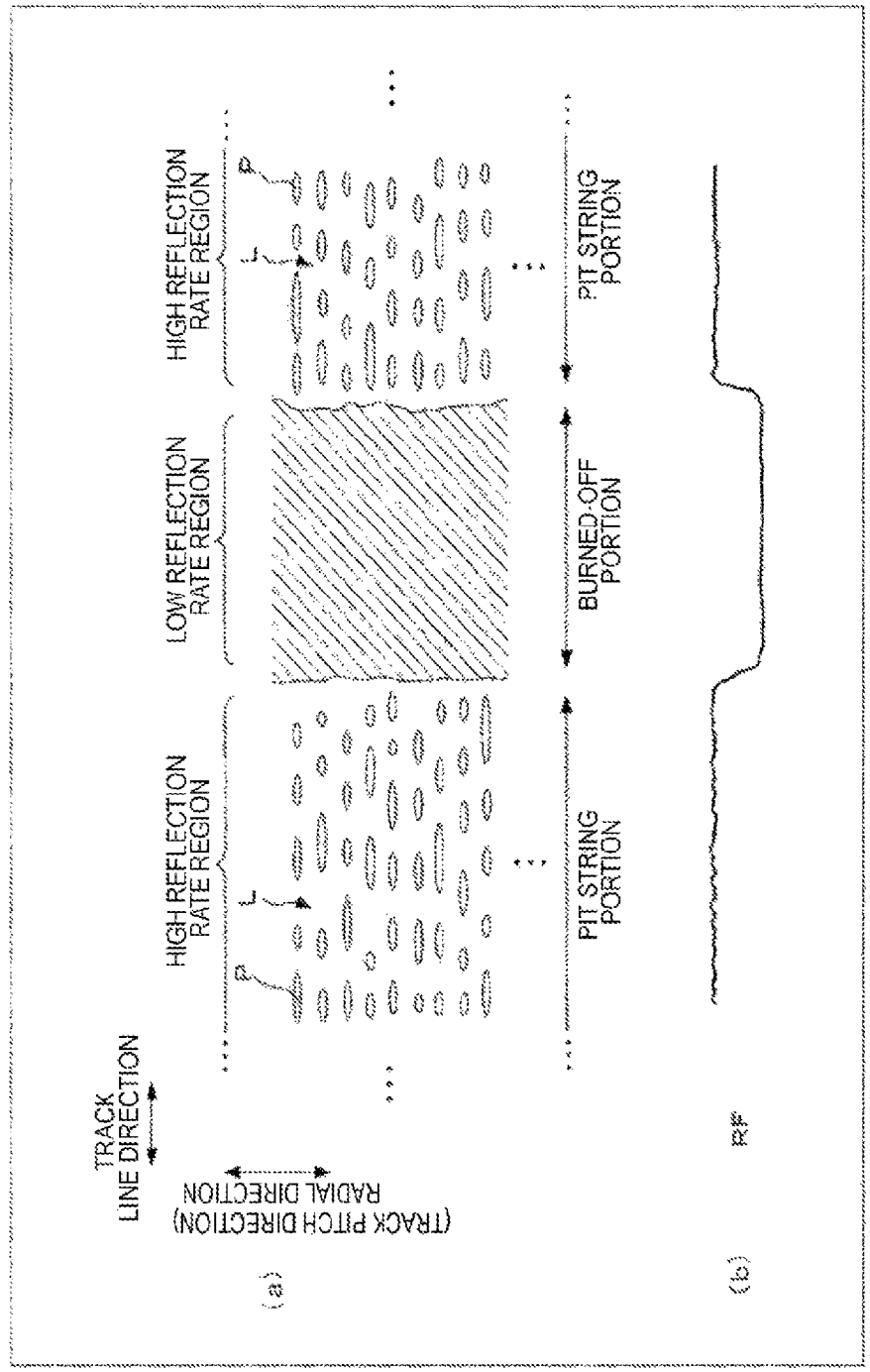
FIGS. 4(a) and 4(b) are schematic explanatory diagrams illustrating a conventional BCA.

FIGS. 3(a) and 3(b) schematically illustrate the BCA thus formed in the same format as FIG. 4 explained above.

As illustrated in FIG. 3(a), the low reflection rate regions LA and the high reflection rate regions HA of the BCA appear alternately in the track line direction. On the contrary to the case of FIG. 4, the low reflection rate region LA is the pit string portion including the pit strings P and the lands L.

The high reflection rate region HA is a mirror portion.

More specifically, in the case of the present embodiment, when the original disk is manufactured, the uneven pattern corresponding to the pit string of the low reflection rate region LA is already formed on the disk original disk as the BCA (the range of radius 21.0 mm to 22.2 mm). The high reflection rate region HA is a corresponding protruding portion with the continuous land L including no pit string.

Although the disk manufacturing step will be explained later, a stamper is generated from the disk original disk, and the optical disk is further mass-produced using the stamper, but when the mass-produced optical disk is manufactured, the BCA is already formed.

When the reproduction device reproduces the BCA, the waveform of the obtained RF signal (reproduction signal) is what is illustrated in FIG. 5(b). More specifically, in the high reflection rate region HA which is the mirror portion, high reflection light is obtained, and therefore, the RF signal level is high.

The low reflection rate region LA is the pit string, but in the low reflection rate region LA, the amount of reflection light is less than the mirror portion, and therefore the RF signal level is low.

In the reproduction device, information of "1" "0" can be obtained from difference of the amplitude of the RF signal in the high reflection rate regions HA and the low reflection rate regions LA, and therefore, the information recorded in the BCA can be read.

In this case, as stated in FIG. 5(a), when the RF signal waveform is affected by the modulation of the pit string portion, the amplitude greatly changes in the low reflection rate region LA in the present example.

In contrast, in the present embodiment, the modulation component and the signal level of the RF signal is suppressed in the low reflection rate region LA as explained later.

In the case of the Blu-ray disk, the wavelength $\lambda$ is 405 nm, and the NA is 0.85. Therefore, due to the principle of the spatial frequency characteristics, the reproduction device cannot perform resolution process when the cut off frequency is $2NA/\lambda$ is 4197 lines/mm or more.

The spatial frequency length of this numerical value is 0.24 µm, and when, for example, a pit string having a length of 0.12 µm and a land of a length of 0.12 µm are repeated, the degree of modulation cannot be obtained.

In this case, the degree of modulation cannot be obtained regardless of the duty, i.e., the ratio between the pit string P and the land L. Therefore, for example, the pit string length may be 0.20 µm, and the land length may be 0.04 µm. More specifically, in the section of 0.24 µm, the pit string P and the land L may be formed.

Therefore, the BCA pattern which most reliably does not allow modulation to be observed in the RF signal in the low reflection rate region LA is, as illustrated in FIGS. 2(b) and 2(c), a linear pattern in which the length of a combination of the pit strings P and the lands L is 0.24 µm or less.

More specifically, the generation method includes rotating the disk with CAV with the optical modulation signal being in synchronization with the rotation of the turn table when the disk original disk is exposed (cut).

For example, the disk is rotated at 2174 rpm (corresponding to linear velocity 4.917 m/s with radius 21.6 mm), and when an exposure laser is driven with a laser at a cycle of 48.8 nsec, a pit string of a time length of 24.4 nsec is formed. When this is, for example, recorded for 50 pulses, data are formed within the BCA satisfying the standard of the length 12 μm in the line direction.

This recording is performed in the radial direction, for example, with a constant velocity with a pitch of 0.2 μm, a pattern radially in the radial direction is formed.

As described above, in the BCA according to the present embodiment, the low reflection rate region LA is formed with the pit strings, but the pit string is a pit string from which the degree of modulation cannot be obtained in the reproduction signal in view of the spatial frequency. Therefore, the modulation component can be reduced in the RF signal waveform in the low reflection rate region LA.

For example, the BCA can be made to provide an RF signal in which the modulation component in the low reflection rate region LA is suppressed as illustrated in FIG. 5(c).

Therefore, in the RF signal waveform during the BCA reproduction, the signal level in the low reflection rate region LA is prevented from going up and down the slice level due to the modulation component, and appropriate BCA reproduction can be achieved.

3. Second Embodiment

In the above first embodiment, the low reflection rate region LA is formed with the pit strings in the pattern in which the spatial frequency in the line direction is 4197 lines/mm, and the track pitch is 0.2 μm, but there are other conditions where current devices can perform reproduction without any problem, and with such conditions, the production margin of the disks can be enlarged.

The inventors and the like of the present application have conducted simulation of the degree of modulation M and the signal level S with the depth and the duty as parameters, while the spatial frequency in the line direction is not only set as 4197 lines as in the first embodiment, but also set in nine ways, e.g., 4000, 3500, 3000, 2500, 1667, 1300, 1000, 800, 600 lines.

Figure 6:
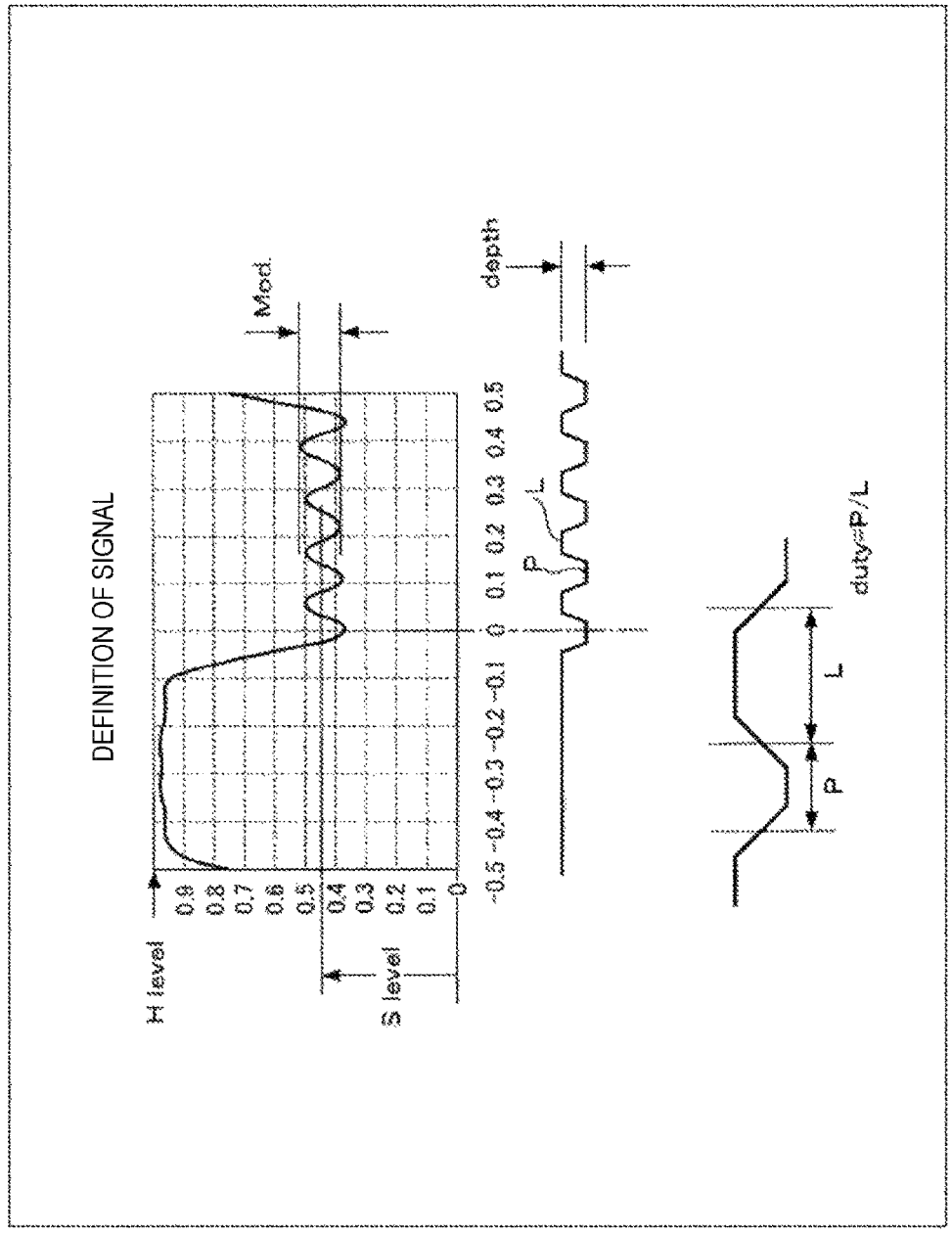
FIG. 6 is an explanatory diagram illustrating a definition of a signal for explanation of a second embodiment.

It should be noted that the definition of the signal in the simulation as explained later is shown in FIG. 6.

In FIG. 6, "H Level" is a reproduction signal level obtained from t a high reflection rate region HA. The high reflection rate region is a mirror portion as illustrated in FIGS. 3(a) and 3(b), and the reproduction signal level in the mirror portion is "1".

"S Level" is a reproduction signal level obtained from t a low reflection rate region LA serving as a pit string portion. "S Level" is also referred to as a pit string reproduction level. This is represented by a value when the reproduction signal level (H Level) in the mirror portion is "1".

The degree of modulation "Mod." is an amplitude level between peak and bottom of the reproduction signal level obtained from the low reflection rate region LA.

The "depth" is a pit string depth, and is a depth from the land L to the pit string P.

The "duty" is a ratio between the pit portion and the land portion.

FIGS. 7, 8, 9, 10, and 11 shows, in cases where the spatial frequencies are 600 lines to 4000 lines, the reproduction signal level "S Level" obtained from the low reflection rate region LA and the degree of modulation (Mod.), which is represented by relationship between the pit string depth (depth) and the pit string/land ratio (duty).

Figure 7:
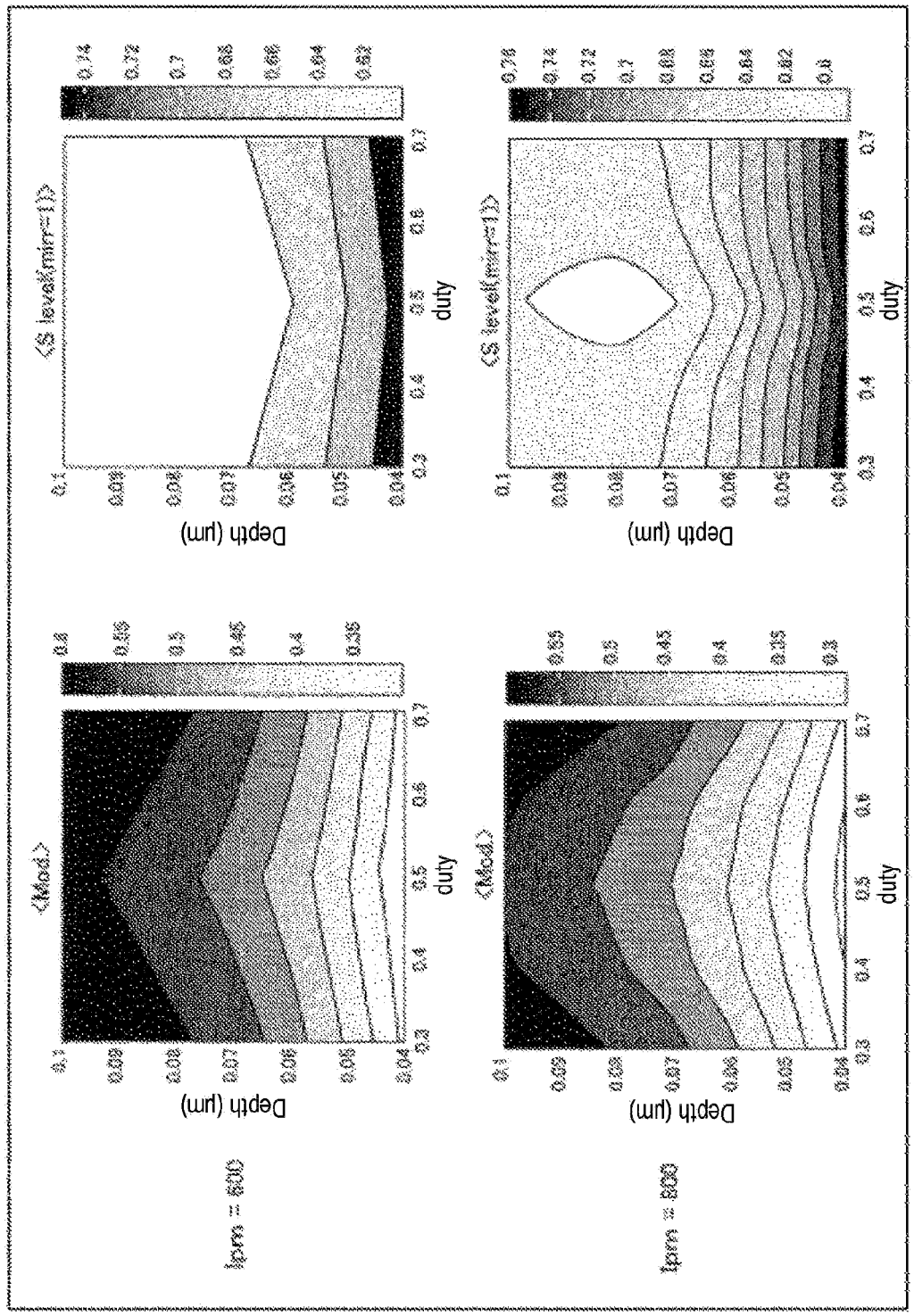
FIG. 7 is an explanatory diagram illustrating a reproduction level of a low reflection rate region and the degree of modulation in cases of spatial frequencies 600, 800.

For example, FIG. 7 shows cases where the spatial frequencies are 600 lines and 800 lines, and shows that the degree of modulation is denoted with the gradation of each region divided by each contour line, which is of the value of the index at the right side.

The S Level (pit string reproduction level) is also denoted with the gradation of each region divided by each contour line, which is of the level of the value of the index at the right side.

In a case of a ROM-type disk based on emboss pit strings, the depth at which the degree of modulation is obtained most is $\lambda/(4N)$: (N is a refractive index of a cover layer), and in a case of a Blu-ray disk, the depth is as follows: 0.405/4/1.55=0.065 μm.

Therefore, in general, the pit string P is generated with the depth of 0.045 to 0.07 μm.

Figure 9:
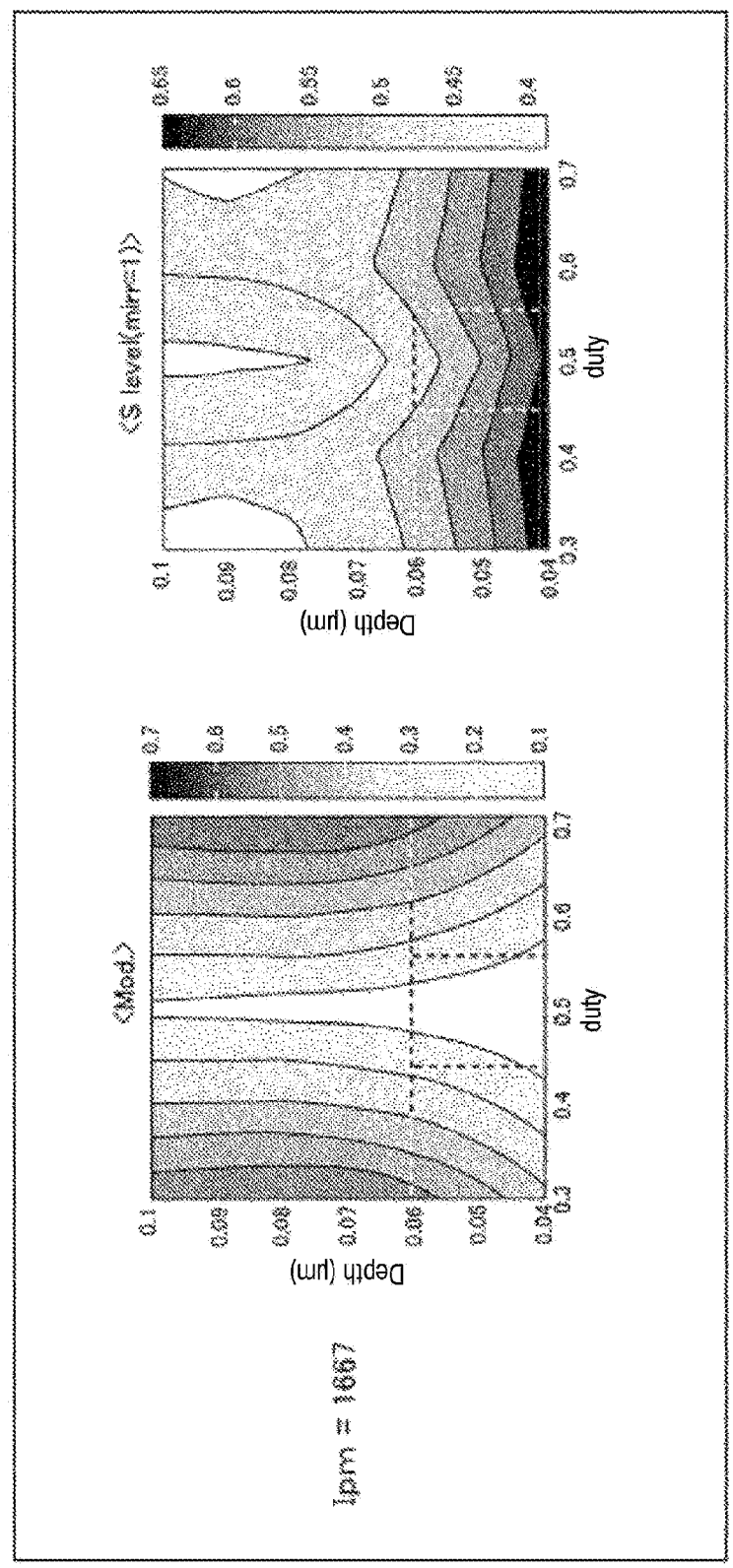
FIG. 9 is an explanatory diagram illustrating a reproduction level of a low reflection rate region and the degree of modulation in a case of spatial frequency 1667.

In this case, the spatial frequency of 1667 lines in FIG. 9 will be considered.

When the pit string depth is 0.06 μm, and the pit string is formed with the duty=50±5%, the degree of modulation (Mod.) is 0.2 or less. More specifically, the degree of modulation as the reproduction signal of the low reflection rate region LA can be small.

The S Level is 0.5 or less. More specifically, it can be sufficiently low level as the reproduction signal level of the low reflection rate region LA.

For this reason, the maximum value of the signal level in the pit string portion is 0.5+0.2/2=0.6, which can be placed within the range that would not cause any problem from a practical standpoint.

More specifically, when $S+M/2 \leq 0.6H$, which has been explained above, holds, the following expressions hold:
S=S Level=0.5
M=Mod.=0.2
H=H Level=1, and therefore, $S+M/2 \leq 0.6H$ is satisfied.

When the spatial frequency is 1667 lines, the cycle is 0.6 μm, and therefore, the pit string length is 0.27 to 0.33 μm.

The way of thinking about the spatial frequency is also applicable to the radial direction. Therefore, the range may be such that the degree of modulation cannot be obtained or no problem would be caused from a practical standpoint, and, for example, when the track pitch of the Blu-ray is 0.32 μm, the spatial frequency is about 3000 lines, and even if the duty is changed by 35 to 65% from the calculation result, the degree of modulation is 0.1 or less, and the signal level is 0.25 or less, which provides a signal that would cause no problem.

Figure 10:
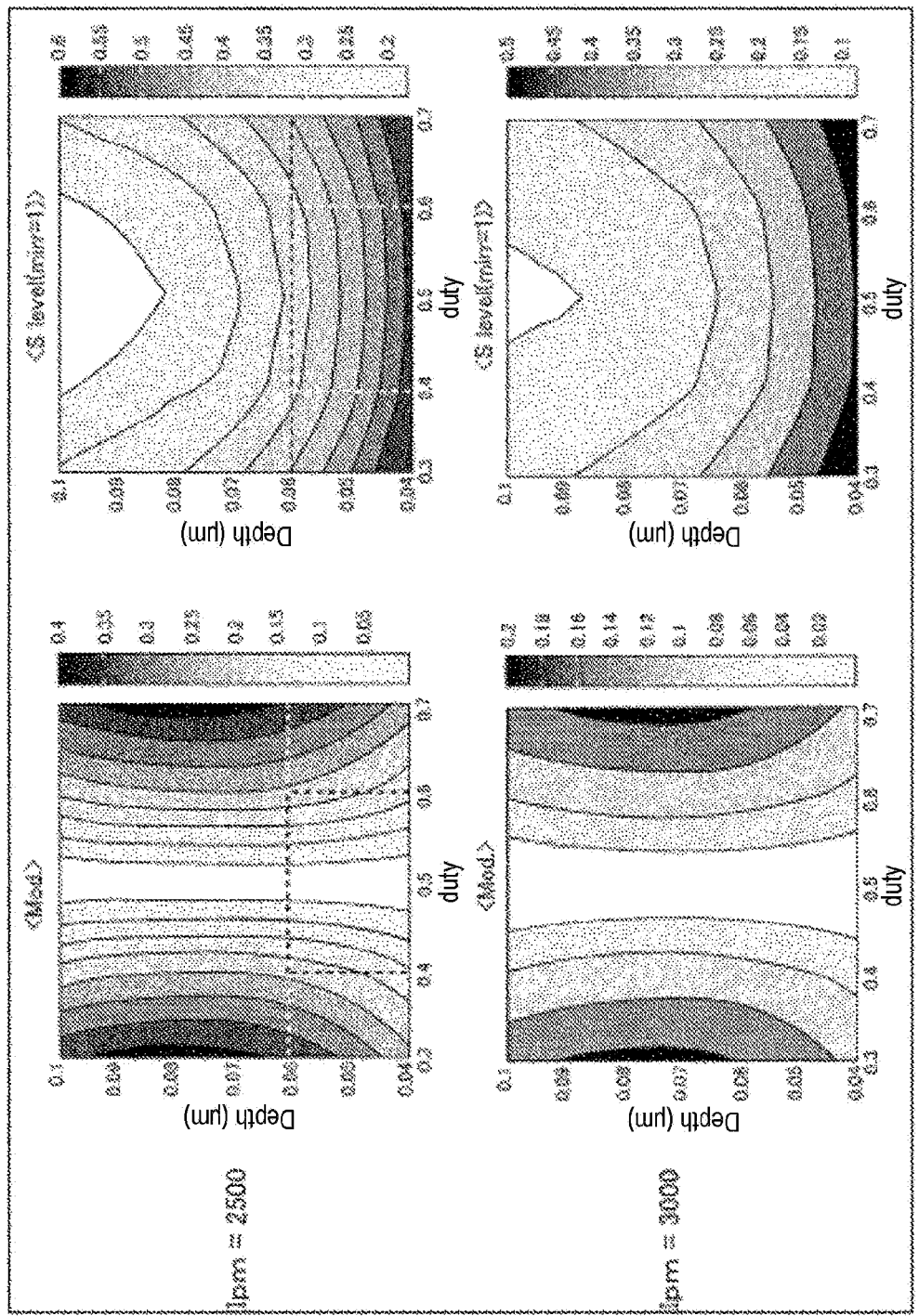
FIG. 10 is an explanatory diagram illustrating a reproduction level of a low reflection rate region and the degree of modulation in cases of spatial frequencies 2500, 3000.
Figure 11:
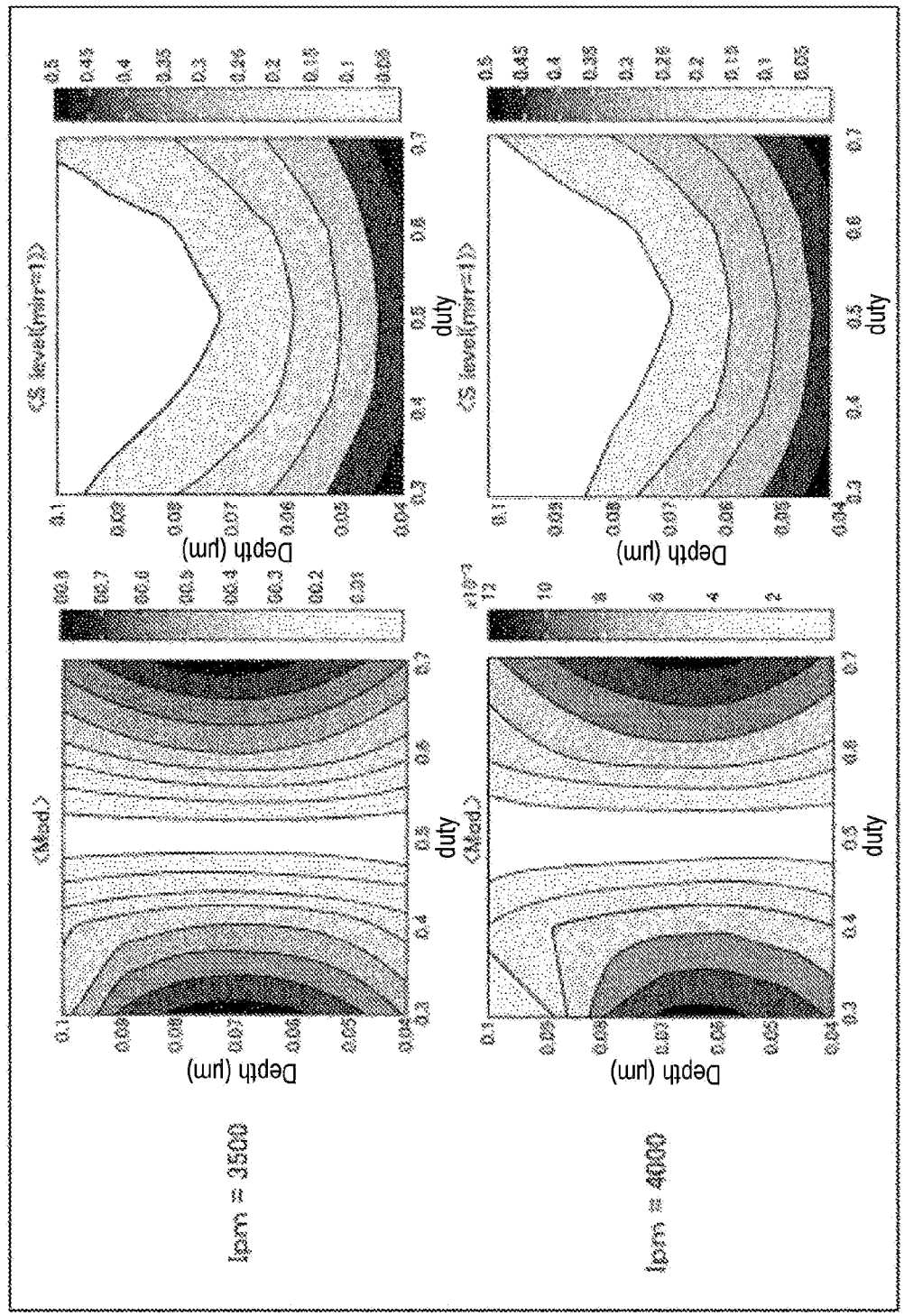
FIG. 11 is an explanatory diagram illustrating a reproduction level of a low reflection rate region and the degree of modulation in cases of spatial frequencies 3500, 4000.

FIGS. 10 and 11 illustrate a case where the spatial frequency is still higher, but, for example, when the spatial frequency is 2500 lines, and the pit string depth is 0.06 μm, the degree of modulation (Mod.) is 0.2 or less in a wide range in which the duty is about 0.4 to 0.6. The S Level is 0.35 or less. Even in this case, $S+M/2 \leq 0.6H$, which is explained above, is satisfied, and the range would cause no problem from a practical standpoint. Even when the spatial frequency is 3000 lines, 3500 lines, and 4000 lines, the problem would not be caused either.

In addition, when the pit string depth is appropriate, it is to be understood that, even when the spatial frequency of the first embodiment explained above is 4197 lines, the following expression is satisfied: $S+M/2 \leq 0.6H$.

Figure 8:
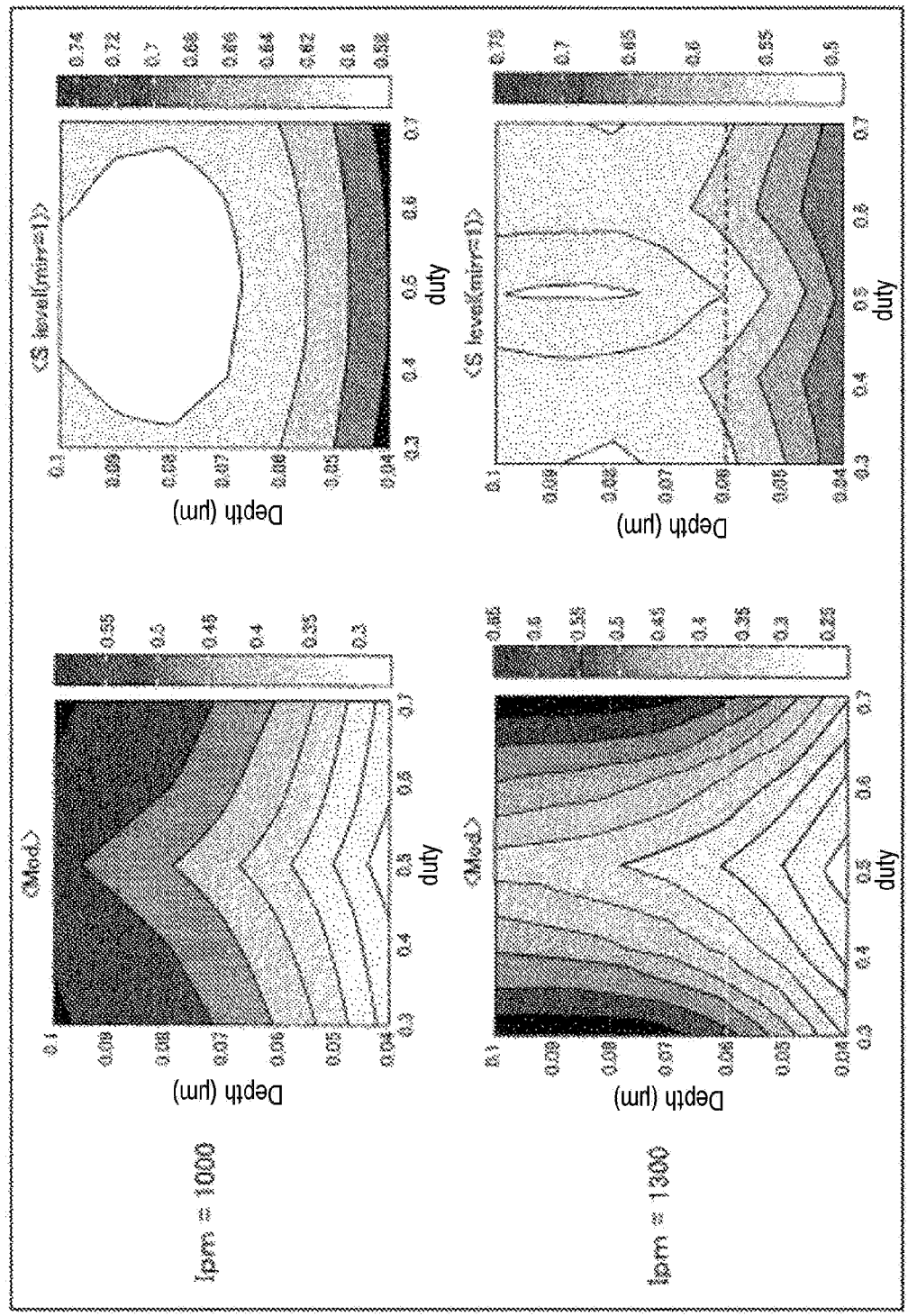
FIG. 8 is an explanatory diagram illustrating a reproduction level of a low reflection rate region and the degree of modulation in cases of spatial frequencies 1000, 1300.

On the other hand, a case of 1300 lines in FIG. 8 will be considered.

When the pit string depth is 0.06 μm, and even if the duty is 50, the degree of modulation (Mod.) is about 0.35, which is relatively large.

The S Level is about 0.55.

Then, S+M/2 is about 0.725, and the following expression is not satisfied: S+M/2≤0.6H. Therefore, problem would be caused in the BCA reproduction.

The case of 1000 lines in the same figure and the cases of 600 lines and 800 lines in FIG. 7 are not appropriate.

Therefore, when the low reflection rate region LA of the BCA is formed with the pit strings as the optical disk of the Blu-ray disk method of the second embodiment, the low reflection rate region LA is appropriately formed with the pit strings of which spatial frequency in the track line direction is 1667 lines/mm or more.

4. Third Embodiment

The third embodiment is illustrated in FIGS. 12(a) and 12(b).

In the above first and second embodiments, the low reflection rate region LA is the pit strings, and the high reflection rate region HA is the mirror portion.

The third embodiment is also the same in that the low reflection rate region LA is the pit strings, but the third embodiment is different in that the high reflection rate region HA is also the pit strings.

However, the low reflection rate region LA is the pit strings such that the degree of modulation of the reproduction signal is small and the signal level is also small, because of the consideration about the spatial frequency explained above.

On the other hand, the high reflection rate region HA is the pit strings such that somewhat high reproduction signal level can be obtained.

FIG. 12(a) schematically illustrates the BCA according to the third embodiment.

In the low reflection rate region LA, the same pit strings as those of the first embodiment are formed (first pit string portion). In the high reflection rate region HA, pit strings different from the first pit string portion are formed (second pit string portion).

For example, the second pit string portion is configured so that a high RF signal level of, e.g., about 0.7, can be obtained, with the settings of the spatial frequency, the pit string depth, the duty, and the like.

As shown in FIG. 12(b), a sufficient difference in the RF signal level is ensured between the first pit string portion and the second pit string portion.

As described above, even when both of the low reflection rate region LA and the high reflection rate region HA are formed with the pit strings, the appropriate BCA can be achieved if the sufficient difference in the RF signal level is ensured between the first pit string portion and the second pit string portion.

In the third embodiment, the high reflection rate region HA is the pit strings, so that the RF signal level of the high reflection rate region HA is lower as compared with the case of the mirror portion in the first embodiment.

This gives an advantage in that it is possible to avoid a situation where the focal servo of the reproduction device becomes unstable because the RF signal level is too high. More specifically, when the RF signal level is high, a focus error signal may not be obtained appropriately depending on the reproduction device. When such situation is to be avoided, it is effective to somewhat reduce the RF signal level with the high reflection rate region HA being the second pit string portion like the present example.

Instead of the second pit string portion, it may be possible to arrange grooves.

5. Fourth Embodiment

The fourth embodiment will be explained. In the fourth embodiment, the pit strings P of the low reflection rate region LA are arranged in such positional relationship from each other that the pit string P is at each apex position of a triangle that does not have any right angle.

FIG. 13(a) illustrates a bar code pattern radially in a BCA portion like FIG. 2(a). A portion indicated by a black belt is the low reflection rate region LA, but this is enlarged and illustrated in FIG. 13(b).

As shown in FIG. 13(b), in the low reflection rate region LA, as an example of a triangle that does not have a right angle, the pit strings P are formed such that each apex position (indicated by black circle) of a regular triangle indicated by a broken line is at substantially center. More specifically, as illustrated in the figure, when, on the surface of the low reflection rate region LA, lines constituting many continuous regular triangles are virtually drawn, each pit string P is formed to include each apex position of the line of the regular triangle virtually drawn.

As a result, overall arrangement of the pit strings are such that the pit strings are displaced and arranged at each track in a so-called staggered manner.

FIGS. 14(a) and 14(b) illustrate the BCA in the same format as FIGS. 3(a) and 3(b) explained above.

As illustrated in FIG. 14(a), the low reflection rate regions LA and the high reflection rate regions HA of the BCA appear alternately in the track line direction. The low reflection rate region LA is the pit string portion including the pit strings P and the lands L, and the high reflection rate region HA is the mirror portion.

In the pit strings of the low reflection rate region LA, the pit strings P are formed to be in a positional relationship based on each apex position of the regular triangle.

Like the case of the first embodiment explained above, when the disk original disk is manufactured, the uneven pattern corresponding to the pit string of the low reflection rate region LA is already formed on the disk original disk as the BCA (the range of radius 21.0 mm to 22.2 mm). The high reflection rate region HA is a corresponding protruding portion with the continuous land L including no pit string. A stamper is generated from the disk original disk, and the optical disk is further mass-produced using the stamper, but at that moment, the BCA is already formed.

Figure 15:
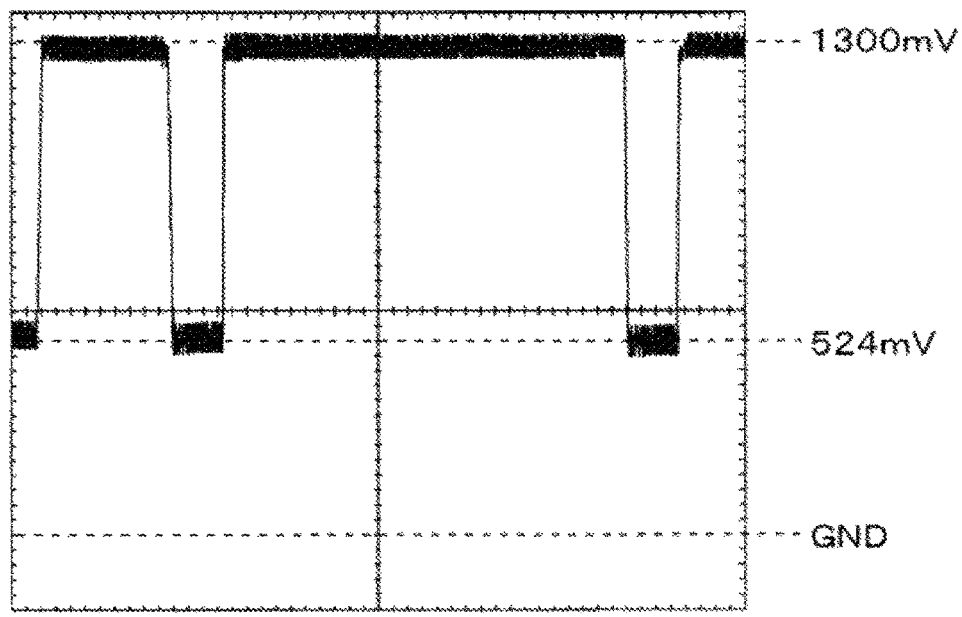
FIG. 15 is an explanatory diagram illustrating a reproduction signal waveform from BCA of the fourth the embodiment.

FIG. 15 illustrates a reproduction signal waveform of the BCA of this fourth embodiment.

The reproduction laser light has a wavelength $\lambda$=405 nm, and an optical system NA=0.85. The pit strings P are formed with 2T pit strings (where T denotes the channel clock cycle) which is the shortest pit string of the Blu-ray disk system, and a pitch PP between central positions of the pit strings P (see FIG. 13(b)) is 315 nm. The center of each pit string P is the apex position of the regular triangle, and accordingly, the pitch PP of all the pit strings P formed in a staggered manner is 315 nm.

As illustrated in FIG. 15, the reproduction signal level of the high reflection rate region HA is about 1300 mV, and the reproduction signal level of the low reflection rate region LA is about 524 mV. The degree of modulation of the low reflection rate region LA is an amplitude of a level of about 80 to 90 mV.

In this case, the reproduction signal level obtained from the reflection light in the high reflection rate region is defined as "H", and the reproduction signal level obtained from the reflection light in the low reflection rate region is defined as "S", and where H is 1, S=0.40 holds. The degree of modulation M is 0.06.

More specifically, S+M/2≤0.6H, which has been explained above, is satisfied, and the BCA would cause no problem from a practical standpoint.

When a system for performing reproduction with a laser light having a wavelength of 405 nm emitted from an optical system of which NA is 0.85 is considered, the low reflection rate region LA is preferably formed with the pit strings of which spatial frequency in the track line direction is 1667 lines/mm, if the consideration about the second embodiment explained above is considered.

The pit strings in the low reflection rate region LA is preferably such that the ratio between the pit string P and the land L is 50±5%.

In the pit strings of the low reflection rate region LA, the track pitch is preferably 0.32 μm or less.

In the fourth embodiment, the pit strings P of the low reflection rate region LA are in a positional relationship based on each apex position of the triangle that does not have any right angle, and are arranged in a staggered manner, but in this case, the following advantages can be considered.

Figure 16:
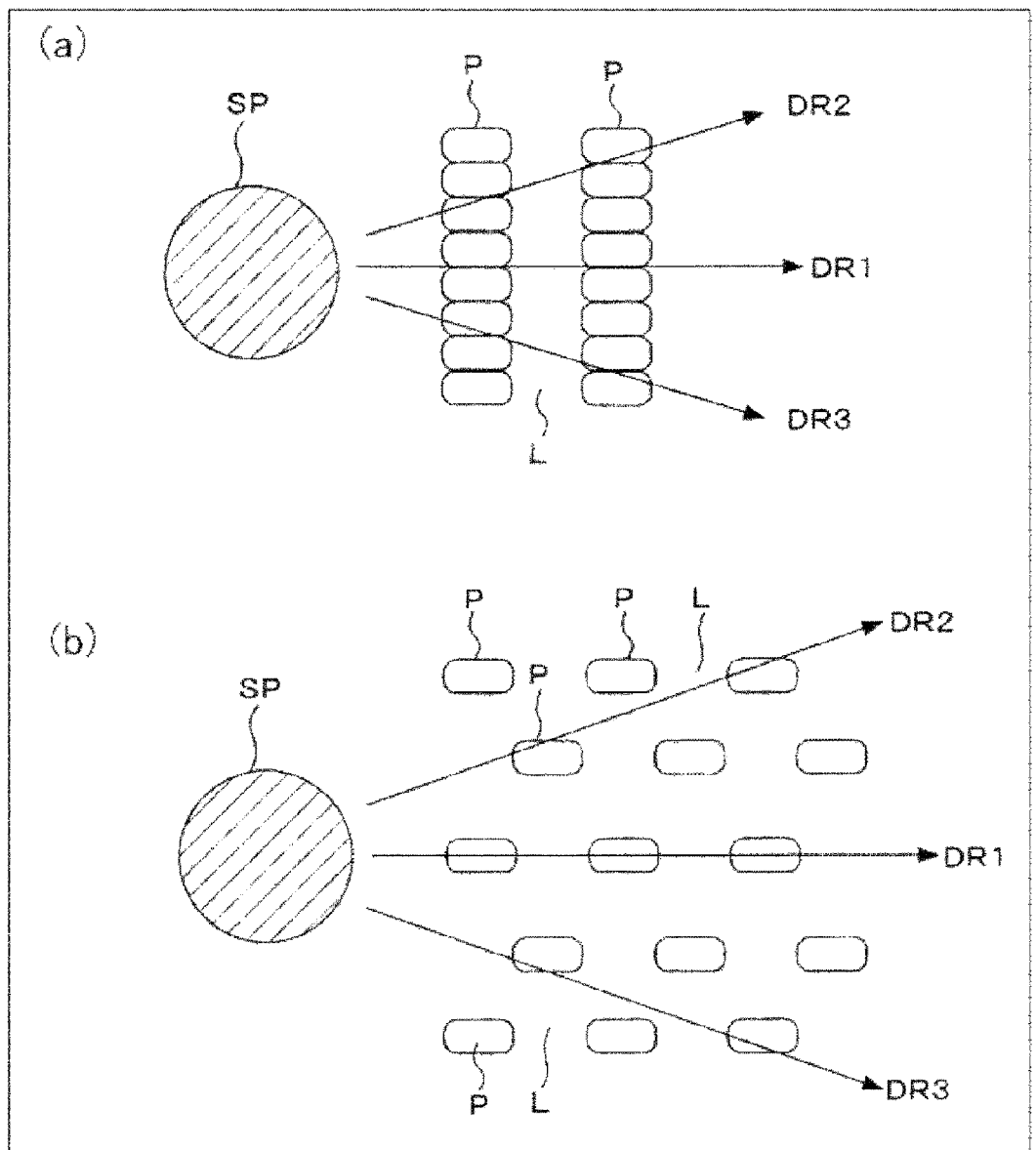
FIGS. 16(a) and 16(b) are explanatory diagrams illustrating a surface density according to the fourth embodiment.

For example, FIG. 16(a) illustrates a case where the pit strings P are continuously arranged in the radial direction as in the first embodiment. Since the BCA is tracking-free, the laser spot SP does not necessarily advance in the track line direction as illustrated by an arrow DR1, and it is normal to advance diagonally with respect to the track line direction as illustrated by arrows DR2, DR3 with respect to the pit strings.

When the laser spot SP advances according to the arrows DR2, DR3, the interval of the pit strings P is longer as compared with the case where the laser spot SP advances according to the arrow DR1. In that sense, there is a disadvantage in that the modulation component is increased. Of course, when the spatial frequency in the track line direction is set appropriately as described above, no problem would be caused from a practical standpoint, but when the interval between the pit strings in the track line direction for this needs is considered, it is necessary to consider the case where the laser spot advances as indicated by the arrows DR2, DR3.

On the other hand, FIG. 16(b) illustrates a case where the pit strings P are arranged in the staggered manner as illustrated in the fourth embodiment. In this case, the laser spot SP is also considered to advance in various kinds of directionalities as illustrated in arrows DR1, DR2, DR3, but in any directionality, the interval between the pit strings P emitted by the laser spot SP is not greatly different. More specifically, it is in a two-dimensionally close state. In this respect, regardless of the spot advancing direction, there is an advantage in that the modulation component does not increase greatly.

According to the pit strings arranged in the staggered manner, even when advancing according to the arrow DR1 as usual, the degree of modulation may decrease due to the effect of the pit strings of the right and left tracks, and in this respect, it would be more advantageous to reduce the degree of modulation of the low reflection rate region LA.

Figure 17:
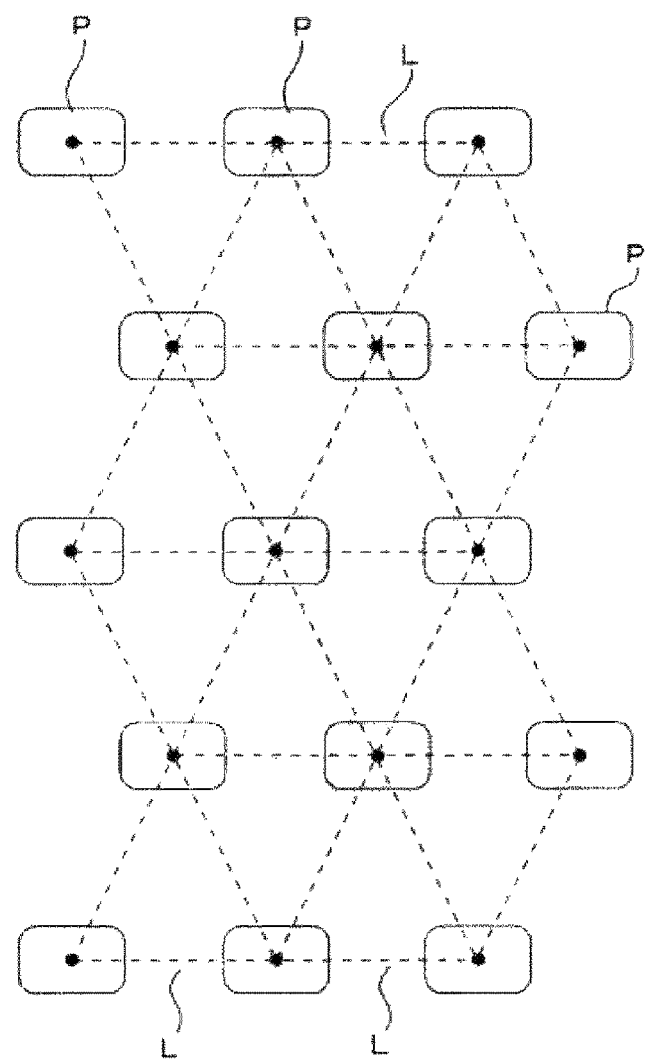
FIG. 17 is an explanatory diagram illustrating a modification of the fourth embodiment.

However, in FIG. 13(b), the pit strings are formed at the apex positions of the regular triangles, but the arrangement is not necessarily limited to the regular triangle shape. More specifically, the triangle that does not have any right angle may be such that the pit strings P are formed to include the apex positions of isosceles triangles as illustrated in FIG. 17, for example.

However, the arrangement of the apex positions of the regular triangles is preferable in view of arranging the pit strings P closely to the surface including both of the track line direction and radial direction (increasing the surface density), and suppressing the degree of modulation of the low reflection rate region LA.

The fourth embodiment may be combined with the third embodiment. More specifically, the low reflection rate region LA is formed with the pit strings P arranged in the staggered manner, but the high reflection rate region HA may be formed with pit strings or group with which a reproduction signal level higher than the pit strings of the low reflection rate region LA can be obtained.

6. Disk Manufacturing Step

Manufacturing steps of the optical disk according to the embodiment will be explained. More specifically, it is the manufacturing steps when, in the BCA, the low reflection rate region LA is formed with the pit strings, or the high reflection rate region HA is formed as the mirror portion (or second pit string portion).

FIG. 18(a) illustrates overall manufacturing steps of the optical disk. This will be explained with reference to FIGS. 19(a) to 19(d) and FIGS. 20(a) to 20(d).

First, mastering is performed to generate an original disk in step F101 of FIG. 18(a).

Figure 19:
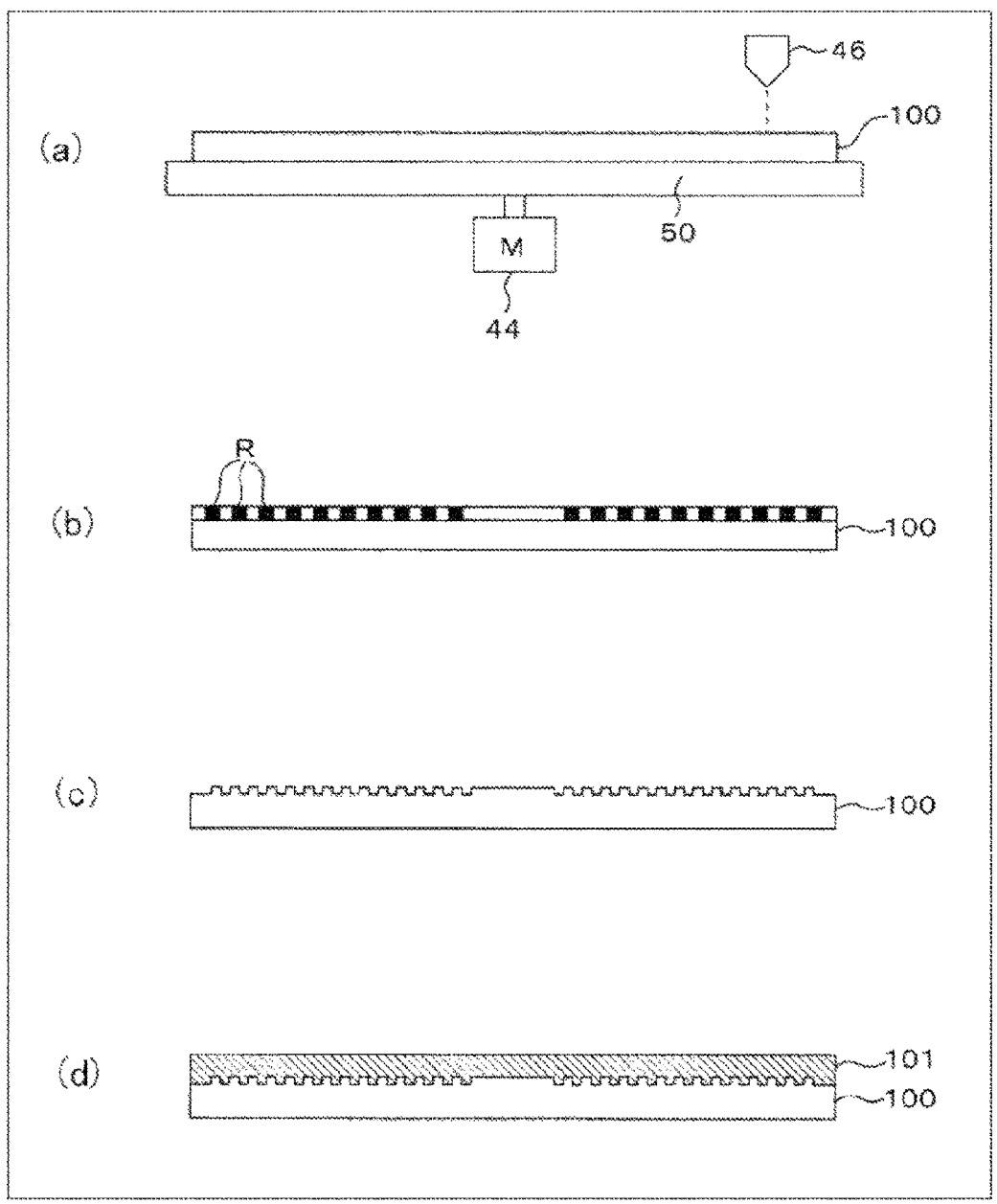
FIGS. 19(a) to 19(d) are explanatory diagrams illustrating disk manufacturing steps of the embodiment.

For example, as illustrated in FIG. 19(a), an exposure head 46 emits laser light, which is modulated in accordance with the recording information, onto a disk original disk 100 on which a resist such as inorganic resist and the like is applied, and exposes in accordance with the pit string pattern. Therefore, as illustrated in FIG. 19(b), an exposure portion R is formed.

Subsequently, in step F102, an original disk is formed.

For example, the original disk exposed as illustrated in FIG. 19(b) is developed, and a disk original disk 100 is made, in which the exposure portions are recessed as illustrated in FIG. 19(c). The recessed portions correspond to the pit strings P of the completed optical disk.

Subsequently, in step F103, a stamper is made.

For example, with nickel electroforming treatment using the disk original disk 100, a stamper 101 is made, on which the unevenness of the disk original disk 100 is transferred (FIG. 19(d)). In the uneven pattern 101a of the stamper 101, the portion corresponding to the pit string is in a protruding shape.

Subsequently, in step F104, a disk substrate is manufactured using the stamper 101.

As illustrated in FIG. 20(a), the stamper 101 is arranged in a mold for molding the substrate. This mold includes a lower cavity 120 and an upper cavity 121, and the stamper 101 for transferring the pit strings is arranged in the lower cavity 120.

Using such mold, for example, the substrate 1 is made by polycarbonate resin injection molding, but the formed substrate 1 is as illustrated in FIG. 20(b).

More specifically, the center of the substrate 1 made of the polycarbonate resin is a center hole 2, and an information reading surface side is a pit string pattern 3 onto which the uneven pattern 101a formed in the stamper 101 in the mold is transferred.

Subsequently, in step F105, a film is deposited on the substrate 1 thus formed.

First, with sputtering, a reflection film 4 is deposited on the pit string pattern transferred from the stamper 101. More specifically, as illustrated in FIG. 20(c), the reflection film 4 of, for example, Ag alloy is formed on the signal reading-out surface side formed with the pit string pattern 3.

Figure 20:
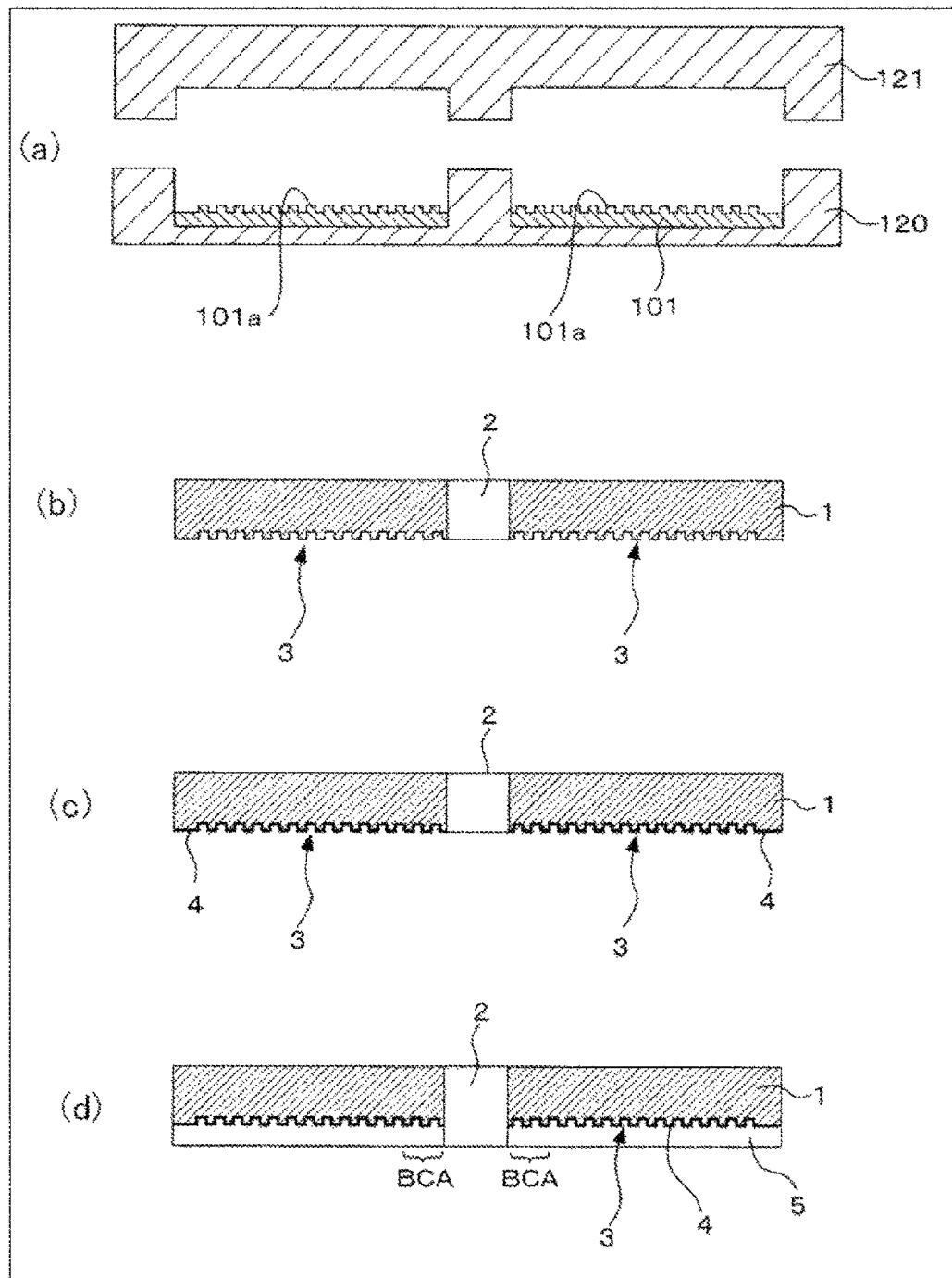
FIGS. 20(a) to 20(d) are explanatory diagrams illustrating disk manufacturing steps of the embodiment.

Further, for example, with UV-curable resin spin coating, a cover layer 5 is formed as illustrated in FIG. 20(*d*).

It should be noted that hard coasting treatment may be further performed on the surface of the cover layer 5.

In this case, one-layer disk having only one recording layer is shown. In a case of multiple layers including two or more layers, a forming step of each recording layer is further added.

After the above deposition steps, a label surface side is printed in step F106, and the optical disk is completed.

As a result of the above steps, the optical disk is formed. In particular, after step F104, the steps are mass production steps, but in the present embodiment, when the deposition steps are completed, the BCA is already formed as illustrated in FIG. 20(*d*).

Figure 18:
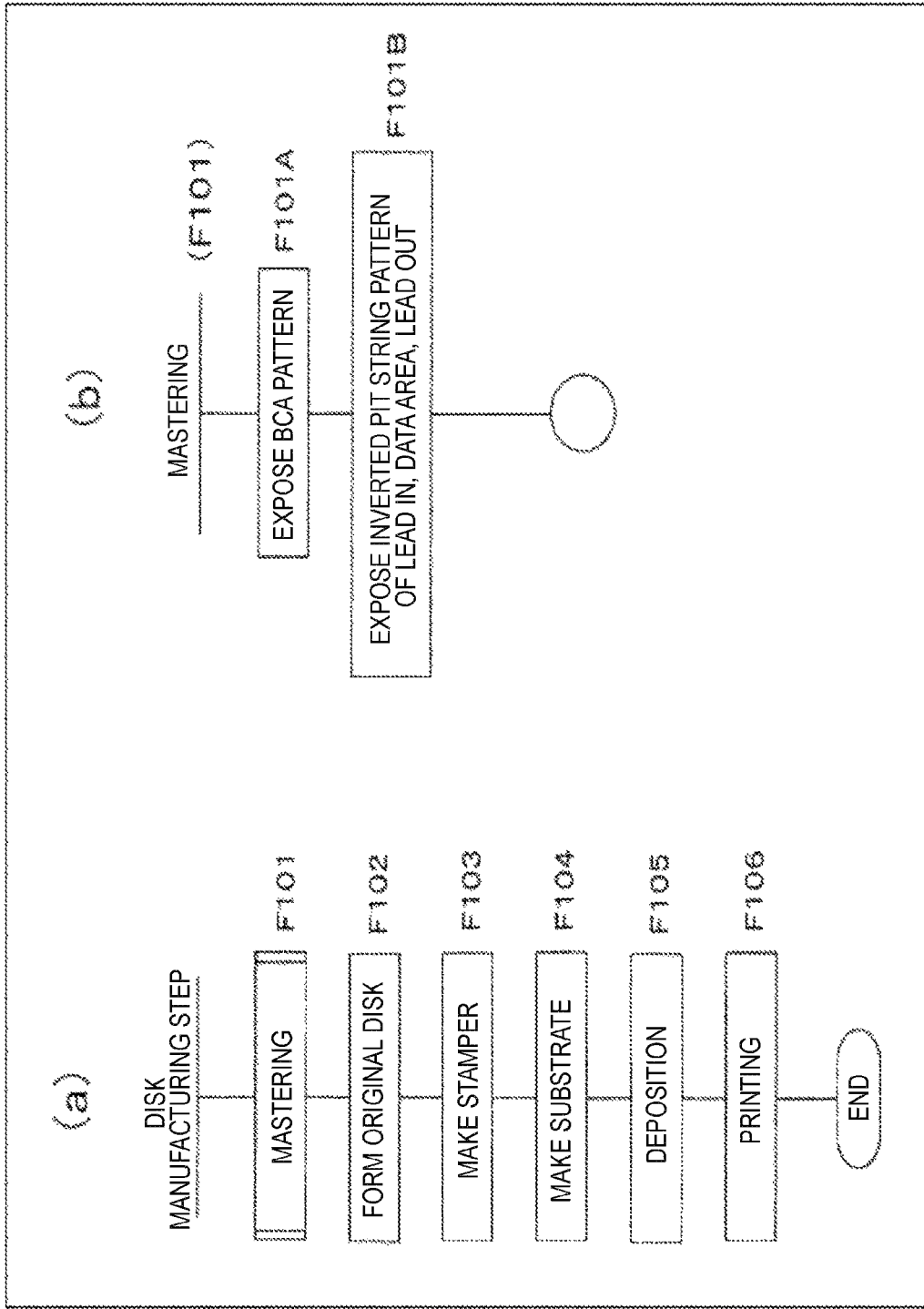
FIGS. 18(a) and 18(b) are flowcharts illustrating disk manufacturing steps of the embodiment.

More specifically, in the step of mastering, the exposure for forming the pit strings for the BCA is done. FIG. 18(*b*) illustrates a mastering step of step F101, but first, the pit strings of the BCA portion are exposed in step F101A. Then, in step F101B, the pit strings in each of the lead in area LI, the data area DA, and the lead out area LO are exposed.

As described above, in the step of mastering, the pit strings for the BCA are exposed, and recessed portions corresponding to the pit strings of the BCA are formed on the disk original disk 100.

For this reason, the disk substrate 1 is manufactured using the stamper 101 manufactured from the disk original disk 100, so that the pit string patterns constituting the BCA is already made as the pit string patterns 3 of the disk substrate 1.

Therefore, thereafter, when the reflection film 4 and the cover layer 5 are formed, the optical disk having the BCA recorded thereon is made, and therefore, unlike the conventional example, it is not necessary to thereafter record the BCA to each optical disk using the BCA recording device.

Figure 21:
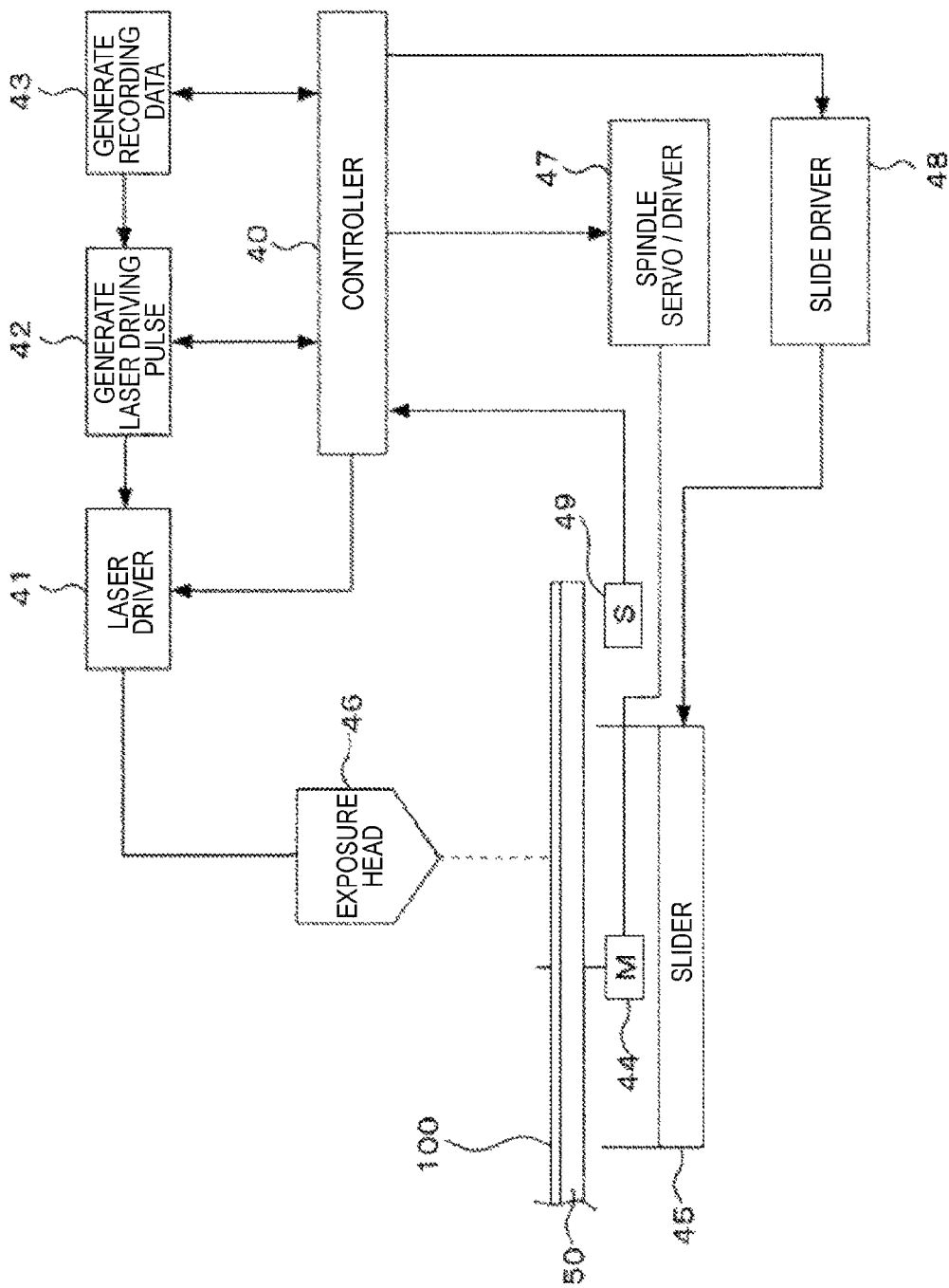
FIG. 21 is a block diagram illustrating a mastering device according to the embodiment.

FIG. 21 illustrates an example of a mastering device used in the mastering step.

In the exposure head 46, an exposure laser light source and a necessary optical system are provided. The laser light source emits light based on a driving signal given by the laser driver 41.

The recording data generating unit 43 outputs recording data on which predetermined modulation processing is performed. When a cutting step of a ROM disk on which the pit strings are exposed is done, modulation operation is performed to turn on and off the laser light source.

For example, the recording data generating unit 43 outputs an RLL (1-7) modulation signal concerning management information and actual content data, and the like which are to be recorded to the optical disk.

The recording data are converted into a laser driving pulse by a laser pulse generating unit 42.

The laser pulse generating unit 42 provides the laser driving pulse to the laser driver 41.

The laser driver 41 provides a driving signal to the exposure laser light source in the exposure head 46 on the basis of the laser driving pulse.

Accordingly, the recording laser light from the exposure laser light source is made into a modulated light in accordance with the pit strings, and an exposure pattern corresponding to the pit strings is formed on the disk original disk 100.

The disk original disk 100 is rotated and driven by the spindle motor 44. The spindle motor 44 is rotated and driven while the rotation speed is controlled by the spindle servo/driver 47. Accordingly, the disk original disk 100 is rotated at, for example, a constant linear velocity or a constant angular velocity.

A slider 45 is driven by a slide driver 48, and moves the entire base including a spindle mechanism carrying the disk original disk 100. More specifically, the disk original disk 100 rotated by the spindle motor 44 is exposed by the optical system while it is moved by the slider 45 in the radial direction, so that the track with the pit strings exposed is formed in a spiral form.

The movement position by the slider 45, i.e., the exposure position of the disk original disk 100 (disk radius position: slider radius position) is detected by a sensor 49. The position detection information by the sensor 49 is provided to the controller 40.

The controller 40 controls the entire mastering device. More specifically, the controller 40 performs, e.g., data output with the recording data generating unit 43, control of the pulse generation parameters in the laser driving pulse generating unit 42, laser power setting of the laser driver 41, spindle rotation operation control with the spindle servo/driver 47, and control of movement operation of the slider 45 with the slide driver 48.

For example, in such mastering device, first, the BCA pattern is exposed in step F101A of FIG. 18(*b*).

For example, in the case of manufacture of the optical disk according to the first embodiment, the controller 40 outputs data (optical modulation signal) for the pit strings of the low reflection rate region LA to the recording data generating unit 43. Then, the disk is rotated with CAV with the optical modulation signal being in synchronization with the spindle rotation.

For example, the disk is rotated at 2174 rpm (corresponding to linear velocity 4.917 m/s with radius 21.6 mm), and when the exposure laser light source is driven with a rectangular pulse of a cycle of 48.8 nsec, a pit string of a length of 24.4 nsec is formed. When this is, for example, recorded for 50 pulses, the pit string patterns can be formed as the low reflection rate region LA satisfying the standard of the length 12 μm in the line direction.

In the portion corresponding to the high reflection rate region HA, the laser is not emitted. More specifically, without exposure, it is made into a land-corresponding portion.

The controller 40 executes this recording operation by controlling the slider 45 to move in the radial direction at a constant velocity of, for example, 0.2 μm pitch, so that the radial exposure pattern is formed in the radial direction on the disk original disk 100.

The controller 40 monitors the detection signal from the sensor 49, and controls execution of the above exposure in the range of, for example, radius of 21.0 mm to 22.2 mm.

Figure 12:
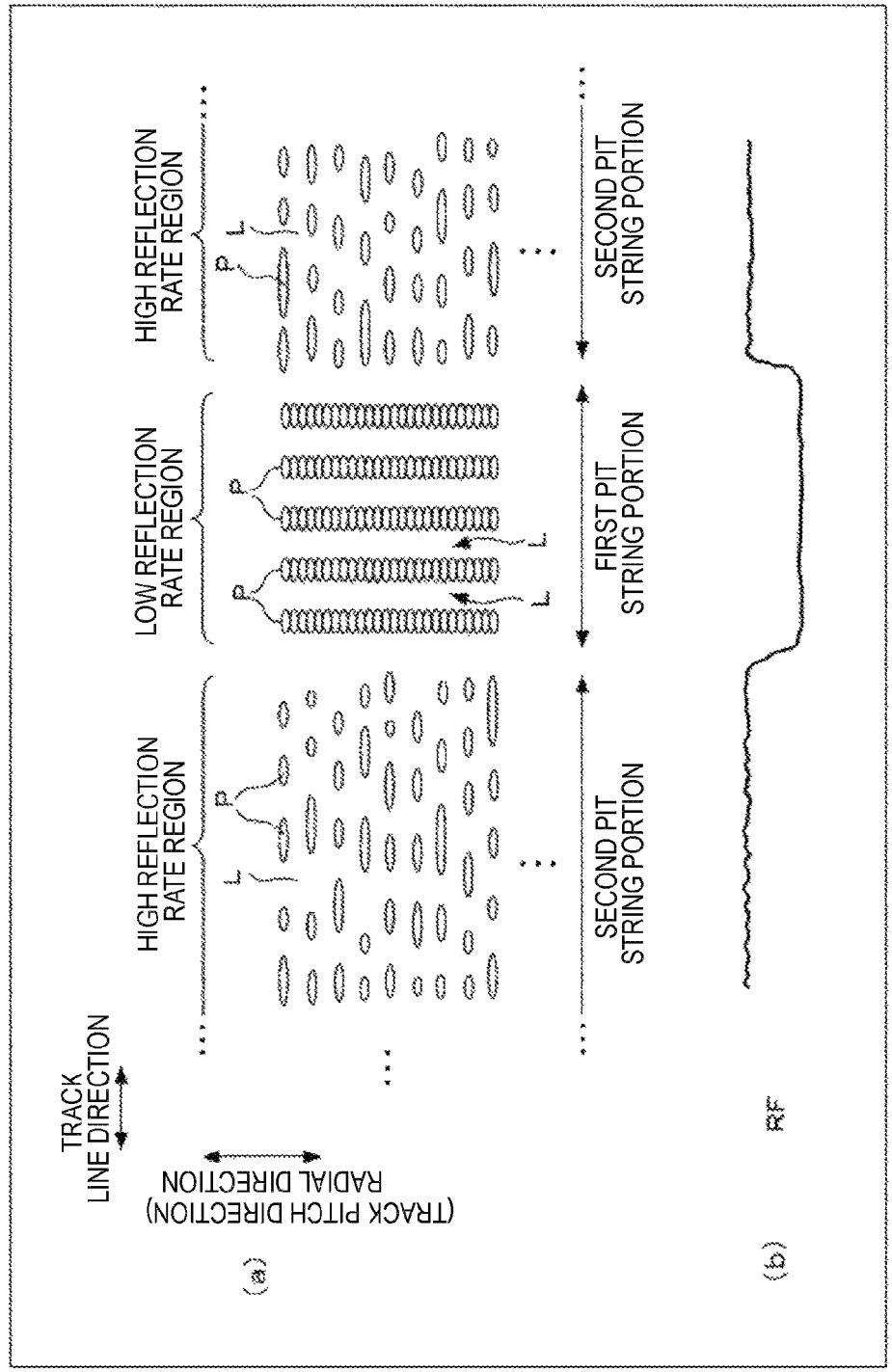
FIGS. 12(a) and 12(b) are schematic explanatory diagrams illustrating a BCA of a third embodiment.

It is to be understood that, in the case of manufacture of the optical disk according to the third embodiment of FIG. 12, the laser is also emitted even in the portion corresponding to the high reflection rate region HA, and the second pit string portion is formed.

Figure 13:
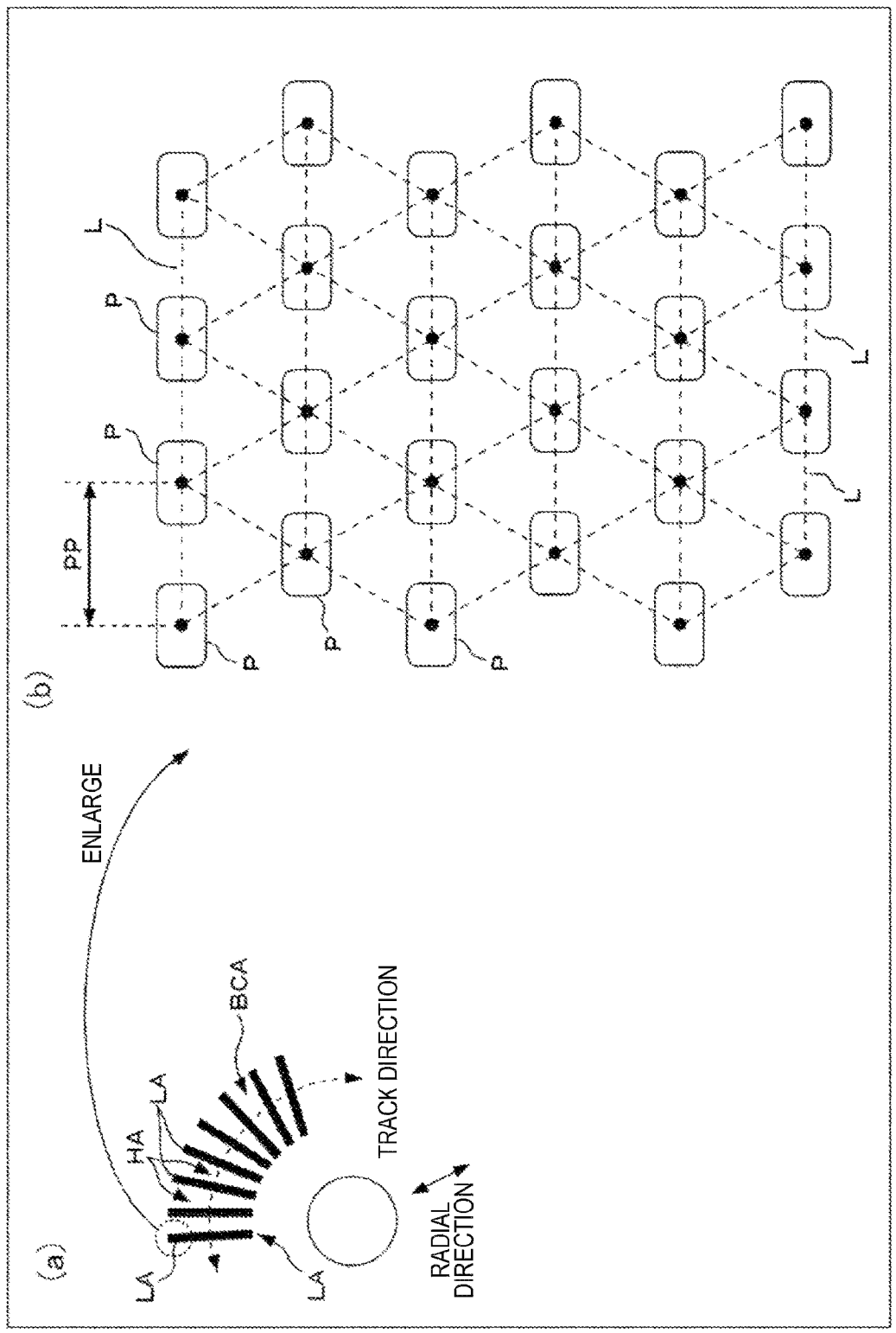
FIGS. 13(a) and 13(b) are explanatory diagrams illustrating a low reflection rate region and a high reflection rate region according to a fourth embodiment.
Figure 14:
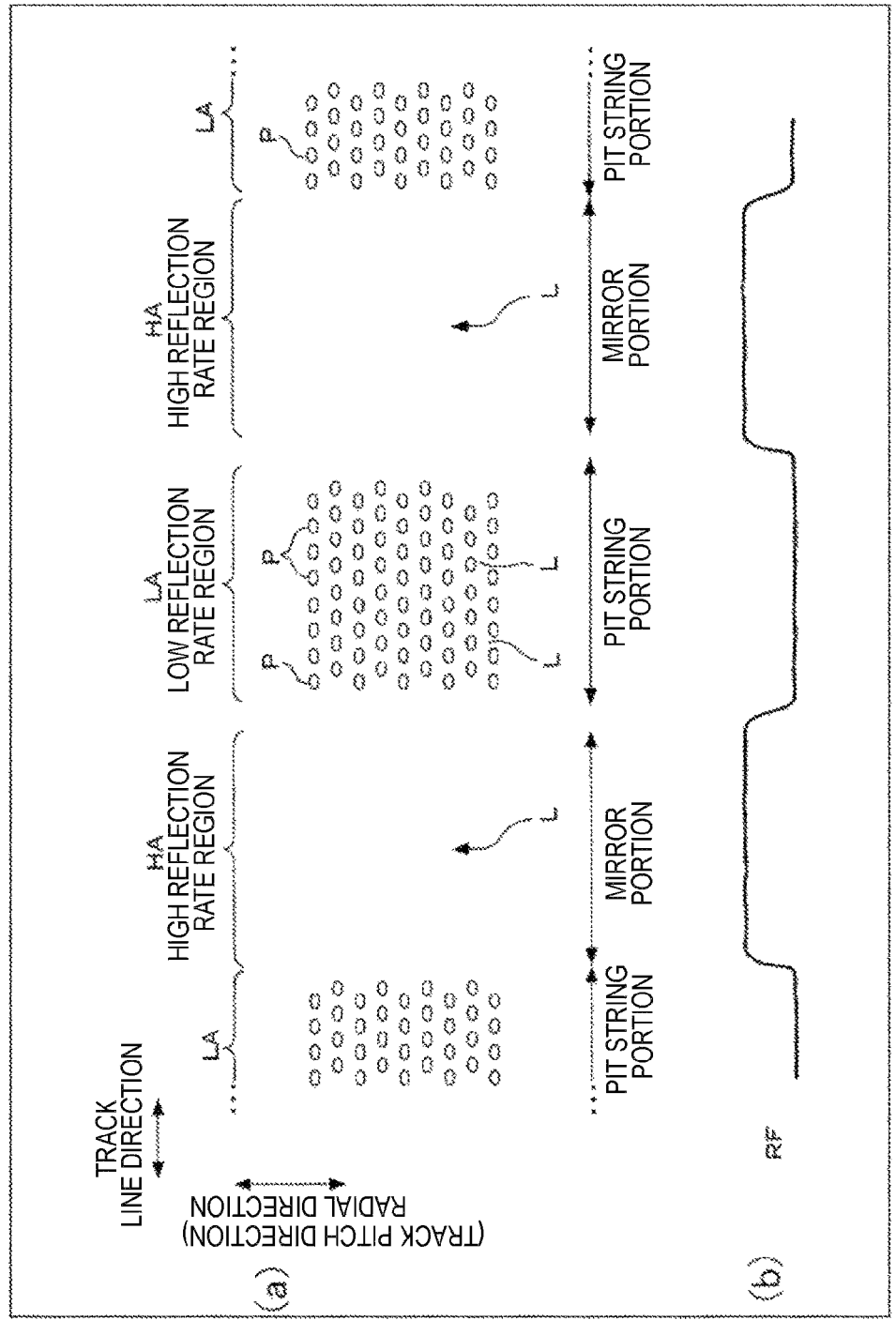
FIGS. 14(a) and 14(b) are schematic explanatory diagrams illustrating a BCA according to the fourth embodiment.

Further, in the case of manufacture of the optical disk according to the fourth embodiment of FIG. 14, the laser is not emitted in the portion corresponding to the high reflection rate region HA, and laser emission timing can be switched for a predetermined period of time on every rotation in the portion corresponding to the low reflection rate region LA, and the slider movement pitch is set appropriately, so that the pit strings (exposure portions) arranged in such positional relationship from each other based on each apex position of regular triangle as illustrated in FIG. 13(*b*) can be formed, and the pit strings (exposure portions) arranged in such positional relationship based on each apex position of isosceles triangle as illustrated in FIG. 17 can be formed.

After the radius of 24.00 mm, the exposure patterns corresponding to the pit strings of the lead in area LI, the data area DA, and the lead out area LO are formed like the ordinary optical disk in the processing of step F101B.

As described above, in the step of mastering, for example, the BCA pattern as illustrated in FIGS. 3(a) to 3(b) (or FIGS. 12(a) and 12(b), or FIGS. 14(a) and 14(b)) is exposed, so that, for example, the optical disk having the BCA recorded with information in units of manufacturing lots can be manufactured without reducing the efficiency of manufacturing and increasing the cost.

In the embodiment, an example where the technique of the present disclosure is applied to the optical disk of the Blu-ray disk method has been explained, but the optical recording medium of the present disclosure can also be applied to other types of optical disks. The optical recording medium of the present disclosure can also recording medium other than a disk form such as a card-shaped optical recording medium.

REFERENCE SIGNS LIST 1 disk substrate, 2 center hole, 3 pit string pattern, 4 reflection film, 5 cover layer, 40 controller, 46 exposure head, 100 disk original disk, 101 stamper, LA low reflection rate region, HA high reflection rate region

The invention claimed is:

1. An optical recording medium formed with a bar code-shaped reflection pattern by forming a high reflection rate region and a low reflection rate region, which appear alternately when seen in a track line direction, in such a state that each is continuous in a track pitch direction, the optical recording medium comprising
   a recording region in which information is recorded with the reflection pattern,
   wherein the low reflection rate region is formed with a pit string, and
   the high reflection rate region and the low reflection rate region are formed to satisfy: $S+M/2 \leq 0.6H$, where a signal level of a reproduction signal obtained from a reflection light in the high reflection rate region is denoted as "H", a signal level of a reproduction signal obtained from a reflection light in the low reflection rate region is denoted as "S", and a degree of modulation of the reproduction signal obtained from the reflection light in the low reflection rate region is denoted as "M".

2. The optical recording medium according to claim 1, wherein
   the optical recording medium is a disk-shaped optical recording medium, and the high reflection rate region and the low reflection rate region are formed such that each is continuous radially in a radial direction which is the track pitch direction, whereby the bar code-shaped reflection pattern is formed.

3. The optical recording medium according to claim 1, wherein
   reproduction is performed with a laser light having a wavelength of 405 nm emitted by an optical system of which NA is 0.85, and
   in the low reflection rate region, a spatial frequency in the track line direction is formed with pit strings of 1667 lines/mm or more.

4. The optical recording medium according to claim 3, wherein
   in the pit string of the low reflection rate region, a ratio between a pit portion and a land portion is 50±5%.

5. The optical recording medium according to claim 3, wherein
   in the pit string of the low reflection rate region, adjacent pit strings in the track pitch direction overlap each other.

6. The optical recording medium according to claim 1, wherein
   the high reflection rate region is a mirror portion where no pit string is formed.

7. The optical recording medium according to claim 1, wherein
   the high reflection rate region is formed with a pit string or group from which a reproduction signal level higher than the pit string in the low reflection rate region is obtained.

8. An optical recording medium formed with a bar code-shaped reflection pattern by forming a high reflection rate region and a low reflection rate region, which appear alternately when seen in a track line direction, in such a state that each is continuous in a track pitch direction, the optical recording medium comprising
   a recording region in which information is recorded with the reflection pattern, wherein the recording region is reproduced with a laser light having a wavelength of 405 nm emitted by an optical system of which NA is 0.85, and
   in the low reflection rate region, a spatial frequency in the track line direction is formed with pit strings of 1667 lines/mm or more.

9. The optical recording medium according to claim 8, wherein
   the optical recording medium is a disk-shaped optical recording medium, and
   the high reflection rate region and the low reflection rate region are formed such that each is continuous radially in a radial direction which is the track pitch direction, whereby the bar code-shaped reflection pattern is formed.

10. The optical recording medium according to claim 9, wherein
    the high reflection rate region and the low reflection rate region are formed to satisfy: $S+M/2 \leq 0.6H$, where a signal level of a reproduction signal obtained from a reflection light in the high reflection rate region is denoted as "H", a signal level of a reproduction signal obtained from a reflection light in the low reflection rate region is denoted as "S", and a degree of modulation of the reproduction signal obtained from the reflection light in the low reflection rate region is denoted as "M".

11. The optical recording medium according to claim 10, wherein
    in the pit string of the low reflection rate region, a ratio between a pit portion and a land portion is 50±5%.

12. The optical recording medium according to claim 10, wherein
    in the pit string of the low reflection rate region, adjacent pit strings in the track pitch direction overlap each other.

13. The optical recording medium according to claim 8, wherein
    the high reflection rate region is a mirror portion where no pit string is formed.

14. A manufacturing method for an optical recording medium
    the manufacturing method comprising:
    manufacturing an original disk arranged with an uneven pattern based on recording information;
    making a stamper on which the uneven pattern of the original disk is transferred;
    making a substrate on which the uneven pattern of the stamper is transferred;

forming the optical recording medium by forming a predetermined layer structure on the substrate; and forming the uneven pattern corresponding to a recording region including a high reflection rate region and a low reflection rate region on the original disk, so that the recording region is formed on the optical recording medium, wherein the high reflection rate region and the low reflection rate region appear alternately when seen in a track line direction, in such a state that each of the high reflection rate region and the low reflection rate region is continuous in a track pitch direction, wherein the low reflection rate region is formed with a pit string, and the high reflection rate region and the low reflection rate region are formed to satisfy: $S+M/2 \leq 0.6H$, wherein a signal level of a reproduction signal obtained from a reflection light in the high reflection rate region is denoted as "H", a signal level of a reproduction signal obtained from a reflection light in the low reflection rate region is denoted as "S", and a degree of modulation of the reproduction signal obtained from the reflection light in the low reflection rate region is denoted as "M".

15. A manufacturing method for an optical recording medium
the manufacturing method comprising:

manufacturing an original disk arranged with an uneven pattern based on recording information;

making a stamper on which the uneven pattern of the original disk is transferred;

making a substrate on which the uneven pattern of the stamper is transferred;

forming the optical recording medium by forming a predetermined layer structure on the substrate; and forming the uneven pattern corresponding to a recording region including a high reflection rate region and a low reflection rate region on the original disk, so that the recording region is formed on the optical recording medium, wherein the high reflection rate region and the low reflection rate region appear alternately when seen in a track line direction, in such a state that each of the high reflection rate region and the low reflection rate region is continuous in a track pitch direction, wherein the recording region is reproduced with a laser light having a wavelength of 405 nm emitted by an optical system of which NA is 0.85, and in the low reflection rate region, a spatial frequency in the track line direction is formed with pit strings of 1667 lines/mm or more.

* * * * *